United States Patent

Yanazume et al.

(10) Patent No.: US 9,774,835 B2
(45) Date of Patent: Sep. 26, 2017

(54) IMAGE PROJECTION SYSTEM AND IMAGE PROJECTION APPARATUS

(71) Applicants: Shinsuke Yanazume, Kanagawa (JP); Hiroshi Baba, Kanagawa (JP)

(72) Inventors: Shinsuke Yanazume, Kanagawa (JP); Hiroshi Baba, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 230 days.

(21) Appl. No.: 14/608,620

(22) Filed: Jan. 29, 2015

(65) Prior Publication Data

US 2015/0244998 A1 Aug. 27, 2015

(30) Foreign Application Priority Data

Feb. 27, 2014 (JP) .................. 2014-037473

(51) Int. Cl.
*H04N 9/31* (2006.01)
*G03B 37/04* (2006.01)

(52) U.S. Cl.
CPC .......... *H04N 9/3185* (2013.01); *G03B 37/04* (2013.01); *H04N 9/3147* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0073393 | A1* | 3/2009 | Lee ................. | G03B 21/00 353/94 |
| 2013/0229396 | A1* | 9/2013 | Huebner ............ | H04N 9/3147 345/207 |
| 2013/0322840 | A1* | 12/2013 | Komatsu ............ | H04N 5/772 386/227 |
| 2015/0017909 | A1* | 1/2015 | Meunier ............ | H04N 5/23229 455/41.1 |

FOREIGN PATENT DOCUMENTS

| | | |
|---|---|---|
| JP | 2011-059675 | 3/2011 |
| JP | 2012-039184 | 2/2012 |

* cited by examiner

*Primary Examiner* — Sath V Perungavoor
*Assistant Examiner* — Janese Duley
(74) *Attorney, Agent, or Firm* — Oblon, McClelland, Maier & Neustadt, L.L.P.

(57) ABSTRACT

An image projection system includes a first image projection apparatus and a second image projection apparatus; each of detecting units that is arranged on the first image projection apparatus and detects whether the second image projection apparatus is in contact with or adjacent to the first image projection apparatus; a specifying unit that specifies a positional relationship between the first image projection apparatus and the second image projection apparatus based on detection results; a dividing unit that divides content data into pieces of divided content data corresponding to the respective image projection apparatuses on the basis of the positional relationship; and a projecting unit that projects a first projection image based on a piece of the divided content (Continued)

data corresponding to the first image projection apparatus on a projected object, and interconnects the first projection image to a second projection image projected by the second image projection apparatus.

12 Claims, 18 Drawing Sheets

FIG.8

| POSITION OF CONTACT SURFACE | POSITION OF SUBJECT IMAGE PROJECTION APPARATUS |
|---|---|
| LEFT SIDE SURFACE | RIGHT |
| RIGHT SIDE SURFACE | LEFT |
| UPPER SIDE SURFACE | BOTTOM |
| LOWER SIDE SURFACE | TOP |

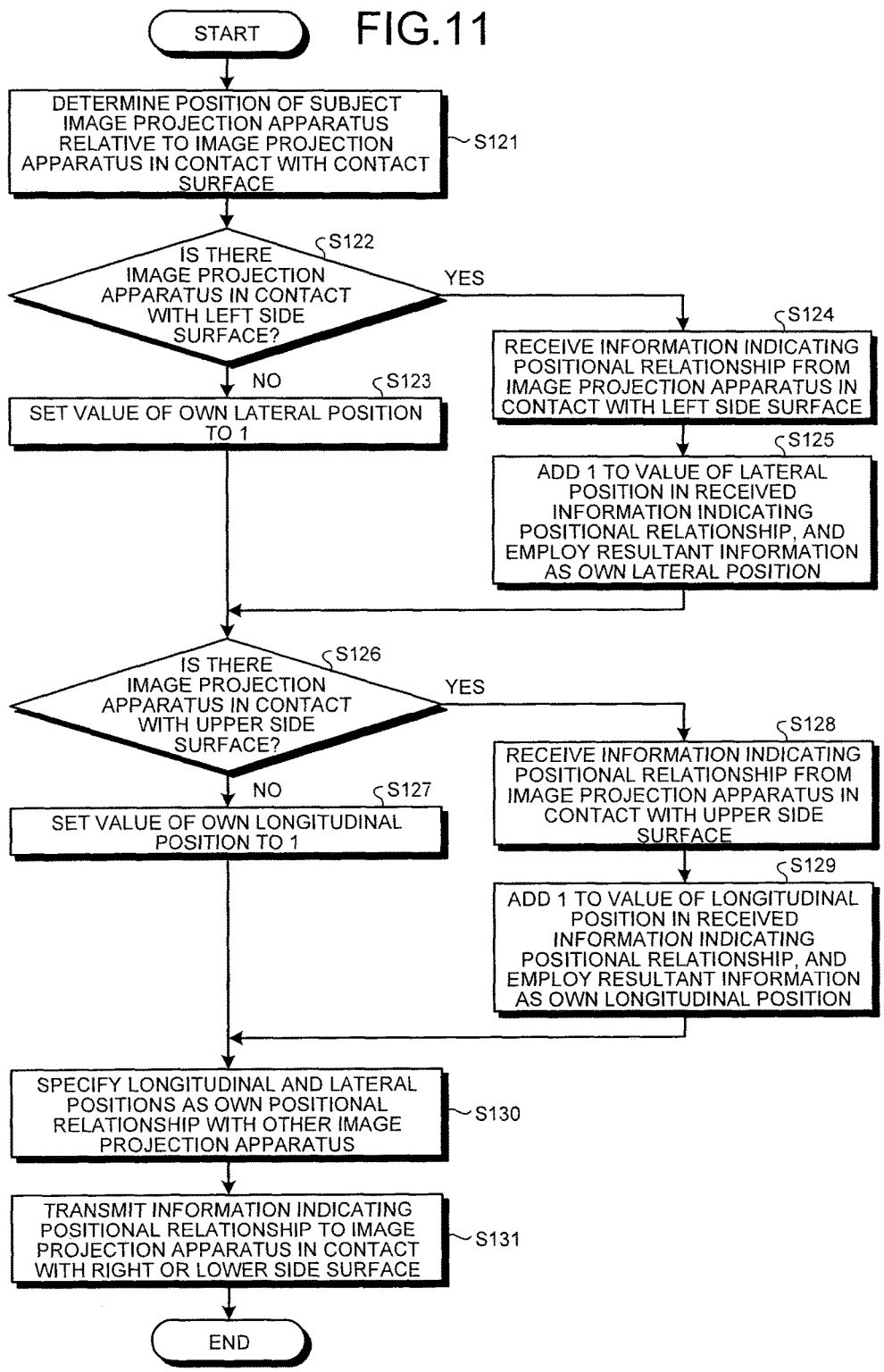

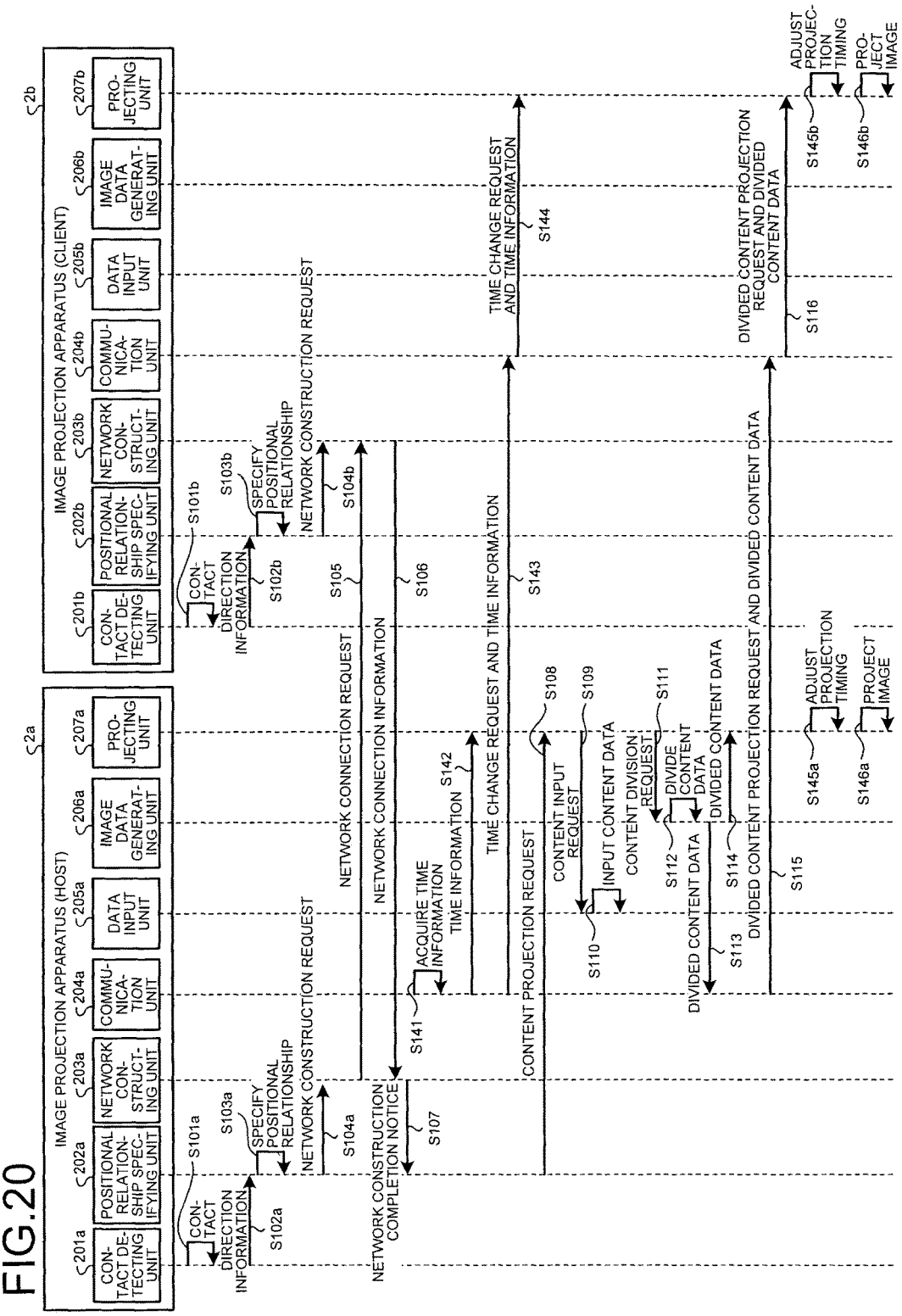

IMAGE PROJECTION SYSTEM AND IMAGE PROJECTION APPARATUS

CROSS-REFERENCE TO RELATED APPLICATIONS

The present application claims priority to and incorporates by reference the entire contents of Japanese Patent Application No. 2014-037473 filed in Japan on Feb. 27, 2014.

BACKGROUND OF THE INVENTION

1. Field of the Invention

The present invention relates to an image projection system and an image projection apparatus.

2. Description of the Related Art

In recent years, mobile projectors are in widespread use because the mobile projectors are easy to install and carry. However, a range of an image that a single projector can project is limited due to a focal length, an angle of view for projection, or the like. Therefore, to enable display in a large screen, in particular, to project panorama video in order to display impressive video, it is necessary to interconnect projection images of a plurality of projectors. There is a known technology to manually input a positional relationship to each of projectors, divide video according to an arrangement position of each of the projectors, and project pieces of the divided video to construct a projection image for a large-screen.

As the above described technology in which a plurality of the projectors divide an image, project the divided images, and interconnect the divided images to one another, a technology has been proposed in which positional relationships of a plurality of projectors are specified based on positional information on each of the projectors obtained by a GPS positioning sensor, a positioning system for indoor location information, or the like (Japanese Patent Application Laid-open No. 2012-39184). In the technology described in Japanese Patent Application Laid-open No. 2012-39184, video (image) to be projected by each of the projectors is generated based on the specified positional relationship of each of the projectors.

However, in the technology described in Patent Application Laid-open No. 2012-39184, to obtain positional information on the projectors, it is necessary to install the GPS positioning sensor, the positioning system for indoor location information, or the like in the same space where the projectors are installed. Therefore, if the above described apparatus or equipment, such as the GPS positioning sensor or the positioning system for indoor location information, other than the projectors is not installed, it is difficult to specify the positional relationships of the projectors and generate video according to the positional relationships.

The present invention has been conceived in view of the above, and there is a need for an image projection system and an image projection apparatus capable of specifying positional relationships of a plurality of image projection apparatuses without an apparatus or equipment other than the image projection apparatus to recognize the positions of the image projection apparatuses.

SUMMARY OF THE INVENTION

It is an object of the present invention to at least partially solve the problems in the conventional technology.

There is provided an image projection system that includes a plurality of image projection apparatuses including a first image projection apparatus and a second image projection apparatus; a plurality of detecting units, each of which is arranged on one of at least some of outer surfaces of a housing of the first image projection apparatus and detects whether the second image projection apparatus is in contact with or adjacent to the one of the outer surfaces of the first image projection apparatus; a specifying unit that specifies a positional relationship between the first image projection apparatus and the second image projection apparatus in accordance with which one of the outer surfaces of the first image projection apparatus the detecting unit, which has detected contact or adjacency with the second image projection apparatus, is provided on; a dividing unit that divides content data into pieces of divided content data corresponding to the respective image projection apparatuses on the basis of the positional relationship; and a projecting unit that projects a first projection image based on a piece of the divided content data corresponding to the first image projection apparatus on a projected object, and interconnects the first projection image to a second projection image projected by the second image projection apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating a configuration example of position determination information;

FIG. 11 is a flowchart illustrating an example of operation performed by the image projection apparatus to specify a positional relationship in the first embodiment;

FIG. 20 is a sequence diagram illustrating an example of operation performed when two image projection apparatuses equalize pieces of time information and then perform interconnected projection in a fourth embodiment.

DETAILED DESCRIPTION OF THE PREFERRED EMBODIMENTS

Exemplary embodiments of an image projection system and an image projection apparatus of the present invention will be described in detail below with reference to the accompanying drawings. The present invention is not limited to the embodiments below, and components in the embodiments below include one that can be easily thought of by a person skilled in the art, one that is practically identical, and one that is within an equivalent range. Further, within a range of not departing from the gist of the embodiments below, various omission, replacement, and alteration of the components may be made.

First Embodiment

Entire Configuration of Image Projection System

Figure 1:
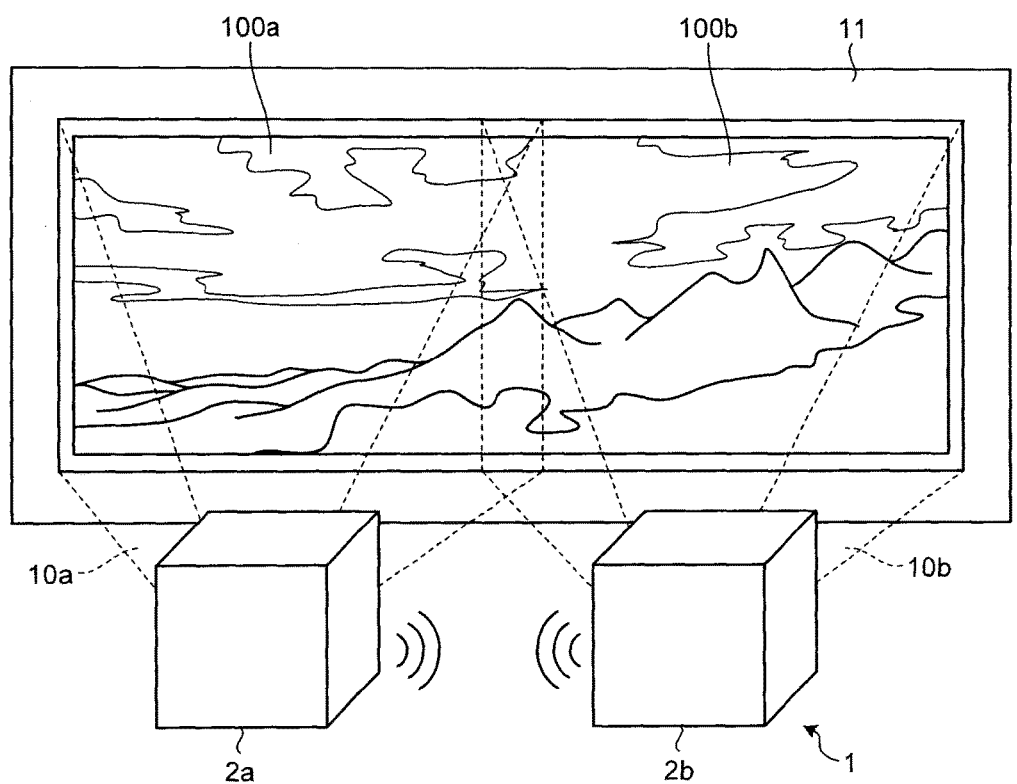
FIG. 1 is a diagram illustrating an example of the entire configuration of an image projection system according to a first embodiment.

FIG. 1 is a diagram illustrating an example of the entire configuration of an image projection system according to a first embodiment. With reference to FIG. 1, the entire configuration of an image projection system 1 will be described.

As illustrated in FIG. 1, the image projection system 1 includes image projection apparatuses 2a and 2b that are projectors. The image projection apparatus 2a emits projection light 10a and projects a projection image 100a on a screen 11. The image projection apparatus 2b emits projection light 10b and projects a projection image 100b on the screen 11. The projection images 100a and 100b form a single interconnected image by partly overlapping each other as will be described later.

The image projection apparatuses 2a and 2b specify a positional relationship by exchanging direction information with each other via near field communication (NFC), which will be described later. The image projection apparatuses 2a and 2b construct a wireless network via wireless fidelity (Wi-Fi) (registered trademark). The image projection apparatuses 2a and 2b project, on the screen 11, images of respective pieces of content data transmitted and received via the wireless network, and connect the respective images to form an interconnected image. When the image projection apparatuses 2a and 2b need not be distinguished from each other or when they are collectively referred to, they may be simply described as the "image projection apparatus(es) 2". The number of the image projection apparatuses 2 included in the image projection system 1 is not limited to two as illustrated in FIG. 1, and may be three or more.

Configuration of Image Projection Apparatus

Figure 2:
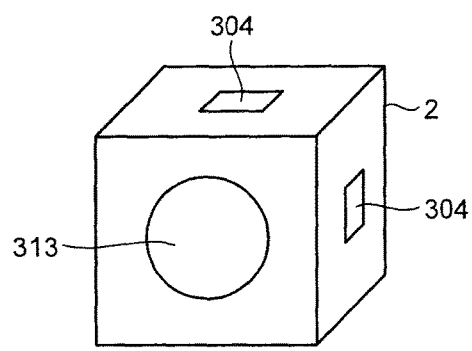
FIG. 2 is an external view of an image projection apparatus according to the first embodiment.

FIG. 2 is an external view of the image projection apparatus according to the first embodiment. With reference to FIG. 2, the external configuration of the image projection apparatus 2 in the image projection system 1 will be described.

The image projection apparatus 2 illustrated in FIG. 2 includes a cuboid-shaped housing and NFC antennas 304 arranged on four outer surfaces of the housing on the left, right, top, and bottom around an outer surface where a lens 313 is disposed, when viewed in a direction normal to the sheet of FIG. 2. The lens 313 is an optical system that emits projection light to a screen and projects content data as a projection image. The NFC antennas 304 are antenna devices that communicate with the NFC antennas 304 of another image projection apparatus 2 adjacent to the subject image projection apparatus 2 via NFC and transmit and receive direction information to and from one another.

The image projection apparatus 2 is not limited to the configuration in which the NFC antennas 304 are arranged on all of the four outer surfaces on the left, right, top, and bottom when viewed in a direction normal to the sheet of FIG. 2, but the NFC antenna 304 may be arranged on at least any of the outer surfaces. Further, the image projection apparatus 2 is not limited to the cuboid shape as illustrated in FIG. 2, and may have any shape, which can be placed on a desk or the like and in which the NFC antenna 304 can be arranged on at least one of the outer surfaces. Furthermore, the image projection apparatus 2 may be any type of a projector, such as a projection type, a liquid crystal type, or a digital light processing (DLP) type.

Figure 3:
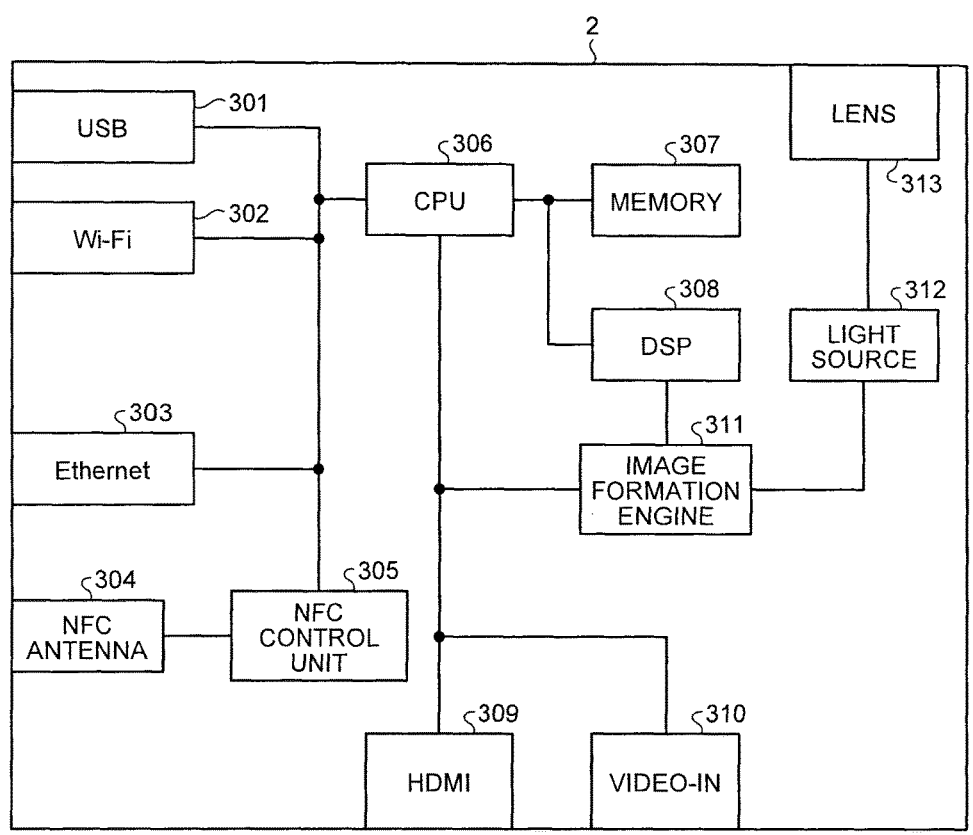
FIG. 3 is a diagram illustrating an example of a hardware configuration of the image projection apparatus according to the first embodiment.

FIG. 3 is a diagram illustrating an example of a hardware configuration of the image projection apparatus according to the first embodiment. With reference to FIG. 3, the hardware configuration of the image projection apparatus 2 in the image projection system 1 will be described.

As illustrated in FIG. 3, the image projection apparatus 2 includes a universal serial bus (USB) interface 301, a Wi-Fi interface 302, an Ethernet (registered trademark) interface 303, the NFC antennas 304, an NFC control unit 305, a central processing unit (CPU) 306, a memory 307, a digital signal processor (DSP) 308, a high-definition multimedia interface (HDMI) 309, a video interface 310, an image formation engine 311, a light source 312, and the lens 313.

The USB interface 301 is a communication interface that connects to an external apparatus and performs data communication with the external apparatus based on the USB standard. The Wi-Fi interface 302 is a communication interface that performs data communication with an external apparatus through wireless communication based on the Wi-Fi standard. The Ethernet interface 303 is a communication interface that is connected to an external apparatus via a local area network (LAN) cable based on the Ethernet standard, and performs data communication based on a communication protocol of transmission control protocol/ Internet protocol (TCP/IP). The CPU 306 transmits data to an external apparatus via each of the above described interfaces. Data received from an external apparatus via each of the interfaces is transmitted to the CPU 306.

The NFC antennas 304 are antenna devices that perform data communication with other NFC antennas via near field communication (NFC) for short-range data communication. The NFC control unit 305 controls operation of the NFC antennas 304. The NFC control unit 305 transmits data received via the NFC antennas 304 to the CPU 306, and transmits data from the CPU 306 to other NFC antennas via the NFC antennas 304.

The CPU 306 controls entire operation of the image projection apparatus 2. The CPU 306 executes a computer program stored in a read only memory (ROM) or the like (not illustrated) by using the memory 307 as a work area (working area) to control the NFC control unit 305, the DSP 308, the image formation engine 311, and the like.

The memory 307 is configured by a random access memory (RAM), a flash memory, or the like. The RAM is used as the work area of the CPU 306 as described above. The flash memory temporarily stores therein content data or the like input from the USB interface 301, the Wi-Fi interface 302, or the Ethernet interface 303 as described above.

The DSP 308 is a microprocessor specialized for image processing or the like, and assists in operation of the CPU 306.

The HEMI 309 is an input interface for digital video and audio. The HEMI 309 enables transmission and reception of video, audio, and a control signal all together by a single cable. The video interface 310 is an input interface for analog video (RGB) and audio.

The image formation engine 311 is a device that converts content data input from each of the above described communication interfaces or from each of the input interfaces or content data stored in the memory 307 to data in a projectable format.

The light source 312 is, for example, a mercury lamp, a halogen lamp, or the like, and emits light containing an image of the content data toward the lens 313. The lens 313 enlarges the light from the light source 312 as projection light with a desired size, and projects the light as a projection image on the screen 11 (see FIG. 1).

Figure 4:
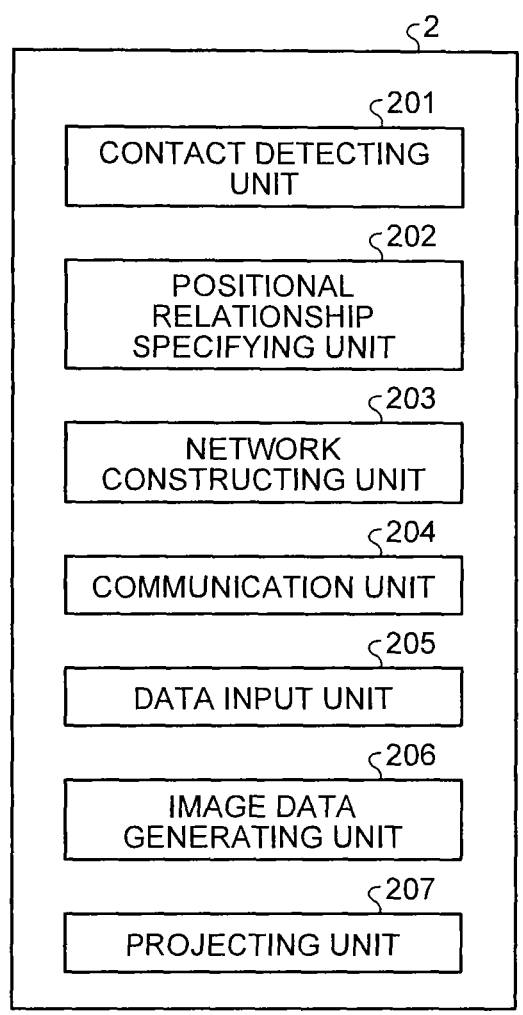
FIG. 4 is a diagram illustrating an example of a block configuration of the image projection apparatus according to the first embodiment.

FIG. 4 is a diagram illustrating an example of a block configuration of the image projection apparatus according to the first embodiment. With reference to FIG. 4, the block configuration of the image projection apparatus 2 in the image projection system 1 will be described.

As illustrated in FIG. 4, the image projection apparatus 2 includes a contact detecting unit 201 (detecting means), a positional relationship specifying unit 202 (specifying means), a network constructing unit 203, a communication unit 204 (communication means), a data input unit 205, an image data generating unit 206 (dividing means), and a projecting unit 207 (projecting means).

The contact detecting unit 201 is a processing unit that detects that the image projection apparatus 2 is in contact with or adjacent to (hereinafter, simply referred to as contact) another image projection apparatus 2, and transmits direction information on the image projection apparatus 2 to the other image projection apparatus 2. The contact detecting unit 201 is implemented by the NFC antennas 304 and the NFC control unit 305 illustrated in FIG. 3. Here, the "adjacent" state means a state in which the contact detecting unit 201 is located at a predetermined distance in which presence of the other image projection apparatus 2 is detectable.

The positional relationship specifying unit 202 specifies a positional relationship between the image projection apparatus 2 and the other image projection apparatus 2 based on direction information of the image projection apparatus 2 that the contact detecting unit 201 has detected according to a surface in contact with the other image projection apparatus, and based on direction information of the other image projection apparatus 2 input from the contact detecting unit 201. The positional relationship specifying unit 202 is implemented by the CPU 306 illustrated in FIG. 3.

The network constructing unit 203 is a processing unit that constructs (establishes) a network by exchanging necessary information with the other image projection apparatus in contact with the contact detecting unit 201. The information necessary to construct the network is, for example, information on a service set identifier (SSID), an authentication type, an authentication key, or the like when the network is constructed based on the Wi-Fi standard. The network constructing unit 203 is implemented by the CPU 306 and the Wi-Fi interface 302 illustrated in FIG. 3.

The communication unit 204 is a processing unit that transmits content data to the other image projection apparatus 2 with which the network is constructed, via the network constructed by the network constructing unit 203. The communication unit 204 is implemented by the CPU 306 and the Wi-Fi interface 302 illustrated in FIG. 3.

The data input unit 205 is a processing unit that inputs, from an external apparatus, content data of an image to be projected by the image projection apparatus 2. The data input unit 205 is implemented by the USB interface 301, the Wi-Fi interface 302, the Ethernet interface 303, the HDMI 309, or the video interface 310 illustrated in FIG. 3.

The image data generating unit 206 is a processing unit that divides the content data on the basis of the positional relationship specified by the positional relationship specifying unit 202, and converts the content data to data in a projectable format. The image data generating unit 206 is implemented by the CPU 306, the DSP 308, and the image formation engine 311 illustrated in FIG. 3.

The projecting unit 207 is a processing unit that projects an image based on the data in the projectable format converted by the image data generating unit 206. The projecting unit 207 is implemented by the CPU 306, the image formation engine 311, the light source 312, and the lens 313 illustrated in FIG. 3.

The contact detecting unit 201, the positional relationship specifying unit 202, the network constructing unit 203, the communication unit 204, the data input unit 205, the image data generating unit 206, and the projecting unit 207 illustrated in FIG. 4 are functionally conceptual and are not limited to this configuration. Further, the positional relationship specifying unit 202, the network constructing unit 203, and the image data generating unit 206 do not necessarily have to be implemented by a computer program as software executed by the CPU 306 or the like, and may be implemented by a hardware circuit.

Figure 5:
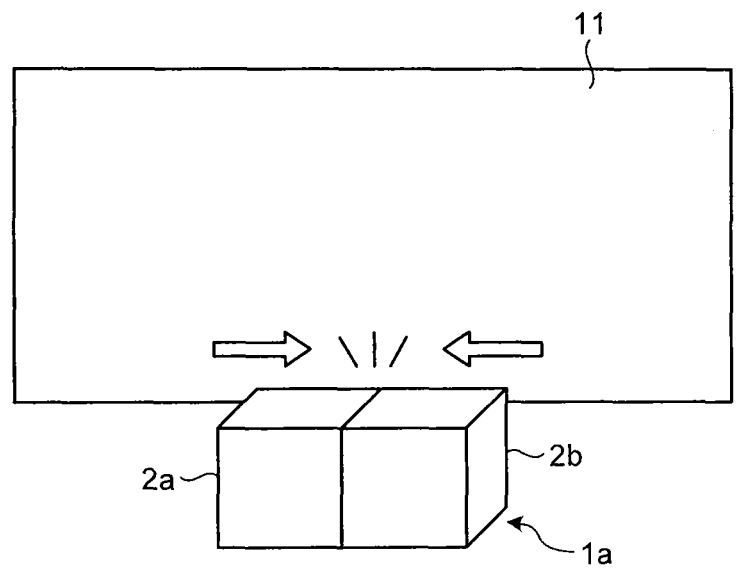
FIG. 5 is a diagram illustrating a configuration example of the image projection system when the image projection apparatuses are in contact with or adjacent to each other in the lateral direction.
Figure 6:
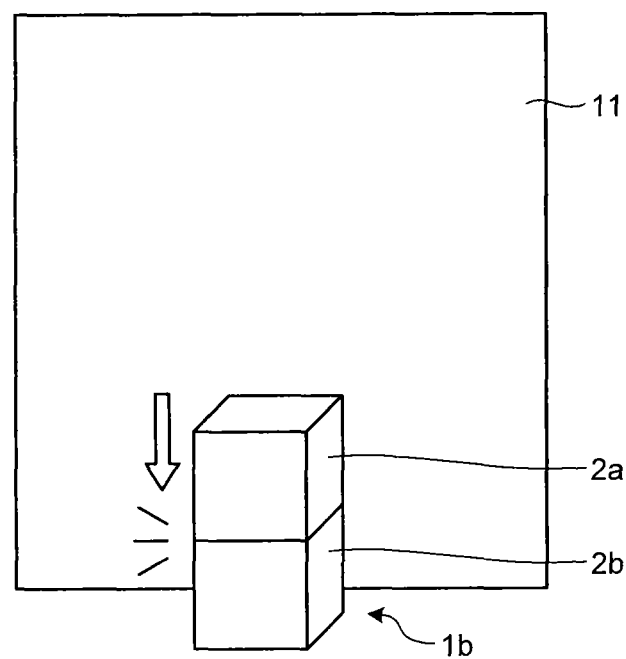
FIG. 6 is a diagram illustrating a configuration example of the image projection system when the image projection apparatuses are in contact with or adjacent to each other in the longitudinal direction.

Configuration example of image projection system including image projection apparatuses in contact with each other FIG. 5 is a diagram illustrating a configuration example of the image projection system when the image projection apparatuses are in contact with or adjacent to each other in the lateral direction. FIG. 6 is a diagram illustrating a configuration example of the image projection system when the image projection apparatuses are in contact with or adjacent to each other in the longitudinal direction.

First, with reference to FIG. 5, an image projection system 1*a* will be described, which is constructed when the image projection apparatuses 2*a* and 2*b* are in contact with each other in the lateral direction. As illustrated in FIG. 5, a user brings a right side surface of the image projection apparatus 2*a* and a left side surface of the image projection apparatus 2*b* in contact with each other when viewed in a direction normal to the sheet of the figure. Accordingly, the NFC antenna 304 (not illustrated) arranged on the right side surface of the image projection apparatus 2*a* and the NFC antenna 304 (not illustrated) arranged on the left side surface of the image projection apparatus 2*b* when viewed in the above described direction detect contact with each other. Therefore, the image projection apparatuses 2*a* and 2*b* construct a network based on the Wi-Fi standard. Then, the image projection apparatus 2*a* divides content data input from an external apparatus and wirelessly transmits a piece of divided content data, which is the content data having been divided, to the image projection apparatus 2*b* via the constructed network. The image projection apparatuses 2*a* and 2*b* project images based on the pieces of the divided content data on the screen 11, connect the respective projection images in the lateral direction, and perform projection (interconnected projection) to form an interconnected image. The interconnected image is a single continuous image formed by overlapping a part of the projection image from the image projection apparatus 2*a* with a part of the projection image from the image projection apparatus 2*b*.

As in the image projection system 1*a* as described above, when the image projection apparatuses 2*a* and 2*b* are in contact with each other in the lateral direction, it becomes possible to project an interconnected image with a wide width in the lateral direction on the screen 11.

Next, with reference to FIG. 6, an image projection system 1*b* will be described, which is constructed when the image projection apparatuses 2*a* and 2*b* are in contact with each other in the longitudinal direction. As illustrated in FIG. 6, a user brings a lower side surface of the image projection apparatus 2*a* and an upper side surface of the image projection apparatus 2*b* in contact with each other when viewed in a direction normal to the sheet of the figure. Accordingly, the NFC antenna 304 (not illustrated) arranged on the lower side surface of the image projection apparatus 2*a* and the NFC antenna 304 (not illustrated) arranged on the upper side surface of the image projection apparatus 2*b* when viewed in the above described direction detect contact with each other. Therefore, the image projection apparatuses 2*a* and 2*b* construct a network based on the Wi-Fi standard. Then, the image projection apparatus 2*a* divides content data input from an external apparatus and wirelessly transmits a piece of divided content data, which is the content data having been divided, to the image projection apparatus 2*b* via the constructed network. The image projection apparatuses 2*a* and 2*b* project images based on the pieces of the divided content data on the screen 11, connect the respective projection images in the longitudinal direction, and perform projection (interconnected projection) to form an interconnected image.

As in the image projection system 1*b* as described above, when the image projection apparatuses 2*a* and 2*b* are in contact with each other in the longitudinal direction, it becomes possible to project an interconnected image with a wide width in the longitudinal direction on the screen 11.

Operation of Interconnected Projection

Figure 7:
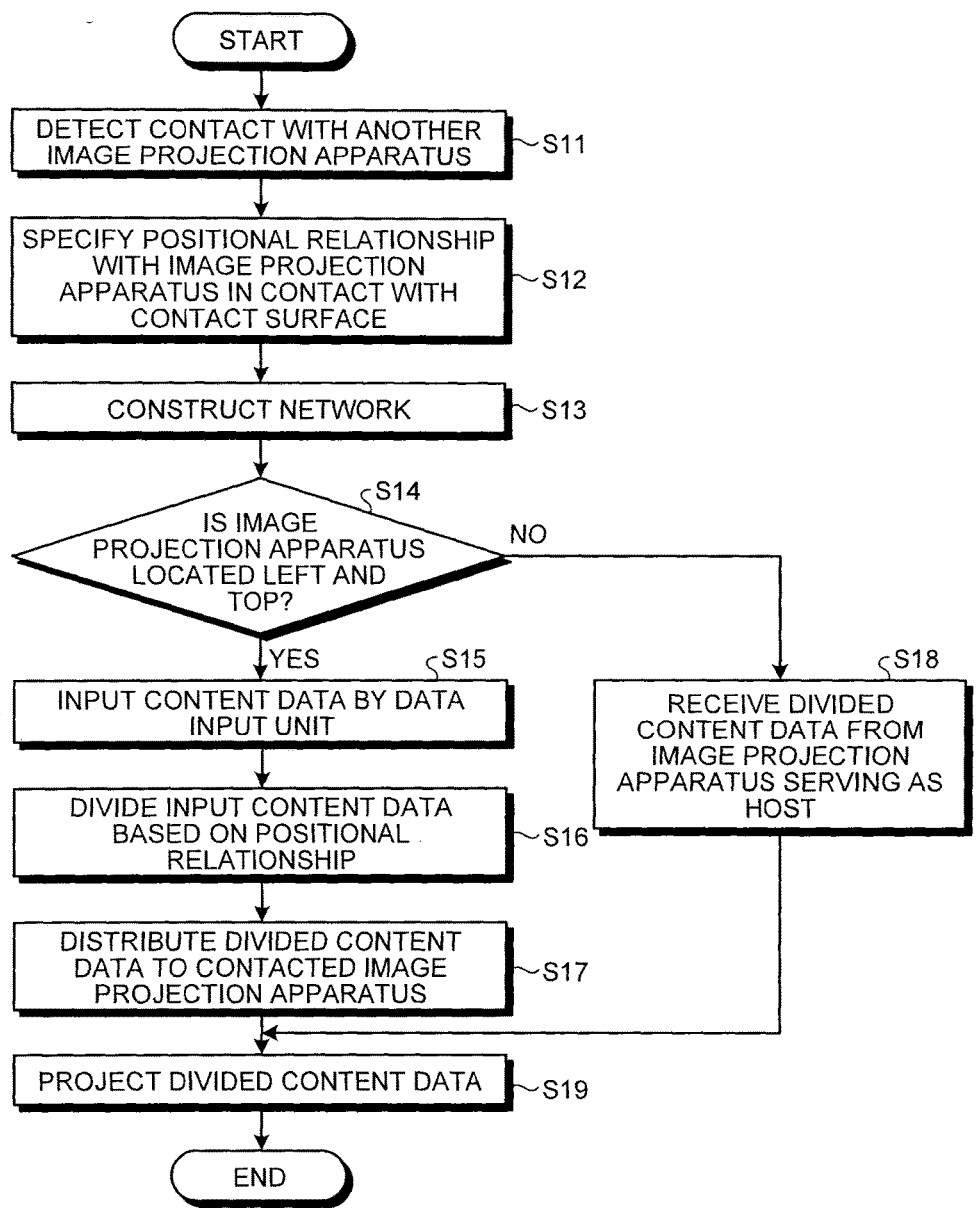
FIG. 7 is a flowchart illustrating an example of operation performed when the image projection apparatuses perform interconnected projection in the first embodiment.

FIG. 7 is a flowchart illustrating an example of operation performed when the image projection apparatuses perform interconnected projection in the first embodiment. FIG. 8 is a diagram illustrating a configuration example of position determination information. With reference to FIGS. 7 and 8, operation will be described, which is performed by each of the image projection apparatuses 2 of the image projection system 1 (1*a* or 1*b*) to specify a positional relationship and perform interconnected projection of an image based on a piece of divided content data.

Step S11

The contact detecting unit 201 of the image projection apparatus 2 (a first image projection apparatus) detects contact with the contact detecting unit 201 of another image projection apparatus 2 (a second image projection apparatus). The contact detecting unit 201 refers to position determination information 110 illustrated in FIG. 8 and generates direction information indicating a position of the image projection apparatus 2 relative to the other image projection apparatus 2. The position determination information 110 is stored in, for example, the memory 307 illustrated in FIG. 3. For example, if the contact detecting unit 201 is arranged on the right side surface of the image projection apparatus 2, the right side surface serves as a surface in contact with the other image projection apparatus 2, and, it is possible to derive that the image projection apparatus 2 is located on the "left" side of the other image projection apparatus 2 by referring to the position determination information 110. The contact detecting unit 201 transmits the generated direction information to the contact detecting unit 201 of the other image projection apparatus 2 via NFC and receives direction information on the other image projection apparatus 2 from the contact detecting unit 201 of the other image projection apparatus 2 via NFC. Then, the process proceeds to Step S12.

The position determination information 110 illustrated in FIG. 8 is data in a table format; however, it is not limited to the table format. Any format is applicable as long as it is a data format that can associate "a position of a surface contact" with "a position of a subject image projection apparatus".

Step S12

The positional relationship specifying unit 202 of the image projection apparatus 2 specifies a positional relationship between the image projection apparatus 2 and the other image projection apparatus 2 based on the direction information generated by the contact detecting unit 201 and the direction information of the other image projection apparatus input from the contact detecting unit 201. When the image projection system 1 includes the two image projection apparatuses 2, the direction information generated by the contact detecting unit 201 directly specifies the positional relationship between the two image projection apparatuses 2. Operation of specifying the positional relationship when the image projection system includes the three or more image projection apparatuses 2 will be described later. The positional relationship specifying unit 202 determines whether the image projection apparatus 2 is a "host" or a "client" based on the specified positional relationship. Specifically, when determining that the image projection apparatus 2 is located on the leftmost and topmost side in the image projection system 1 based on the specified positional relationship, the positional relationship specifying unit 202 determines that the image projection apparatus 2 is the "host", and in other cases, determines that the image projection apparatus 2 is the "client". Then, the process proceeds to Step S13.

Step S13

The network constructing unit 203 of the image projection apparatus 2 constructs a network by exchanging information necessary to construct the network with the other image projection apparatus 2 through wireless communication via the Wi-Fi interface 302. The information necessary to construct the network based on the Wi-Fi standard is information on an SSID, an authentication type, an authentication key, or the like as described above. Then, the process proceeds to Step S14.

Step S14

When the image projection apparatus 2 is the "host" (that is, when located on the leftmost and topmost side) (YES at Step S14), the process proceeds to Step S15. When the image projection apparatus 2 is the "client" (NO at Step S14), the process proceeds to Step S18.

Step S15

The positional relationship specifying unit 202 of the image projection apparatus 2 determines that the image projection apparatus 2 is the "host", and sends a content projection request to the projecting unit 207. The projecting unit 207 that has received the content projection request sends, to the data input unit 205, a content input request to request input of content data from an external apparatus. The data input unit 205 that has received the content input request inputs the content data from the external apparatus. Then, the process proceeds to Step S16.

Step S16

After the data input unit 205 inputs the content data, the projecting unit 207 sends, to the image data generating unit 206, a content division request to divide the content data input by the data input unit 205. The image data generating unit 206 that has received the content division request divides the content data based on the positional relationship specified by the positional relationship specifying unit 202. Then, the process proceeds to Step S17.

Step S17

The communication unit 204 wirelessly transmits (distributes) a piece of divided content data to be projected by the other image projection apparatus 2 from the content data (pieces of divided content data) divided by the image data generating unit 206 via the network constructed by the network constructing unit 203. Then, the process proceeds to Step S19.

Step S18

When the positional relationship specifying unit 202 determines that the image projection apparatus 2 is the "client", the communication unit 204 wirelessly receives a piece of divided content data from the other image projection apparatus 2 serving as the "host" via the network constructed by the network constructing unit 203. Then, the process proceeds to Step S19.

Step S19

The image data generating unit 206 converts the piece of divided content data to data in a projectable format, and sends the converted data to the projecting unit 207. The projecting unit 207 projects, on a projected object such as a screen, an image (first projection image) based on the piece of divided content data in the projectable format converted by the image data generating unit 206. At this time, the projection image based on the piece of divided content data projected by each of the image projection apparatuses 2 is based on the content data divided according to the positional relationship specified by the positional relationship specifying unit 202 of the image projection apparatus 2 serving as the "host". Therefore, the projection image (first projection image) projected by the projecting unit 207 of the image projection apparatus 2 partly overlaps a projection image (second projection image) projected by the projecting unit 207 of the contacted other image projection apparatus 2, so that a single continuous interconnected image is formed.

Through the above described operation, in the image projection system 1, each of the image projection apparatuses 2 specifies a positional relationship and projects an image (the first projection image or the second projection image) based on a piece of the divided content data that is divided based on the positional relationship, in an interconnected manner.

While the positional relationship specifying unit 202 determines that the image projection apparatus 2 is the "host" when the image projection apparatus 2 is located on the leftmost and topmost side in the image projection system 1 based on the specified positional relationship, it is not limited thereto. For example, it may be possible to determine that the image projection apparatus 2 is the "host" when the image projection apparatus 2 is located on the rightmost and bottommost side in the image projection system 1.

Figure 9:
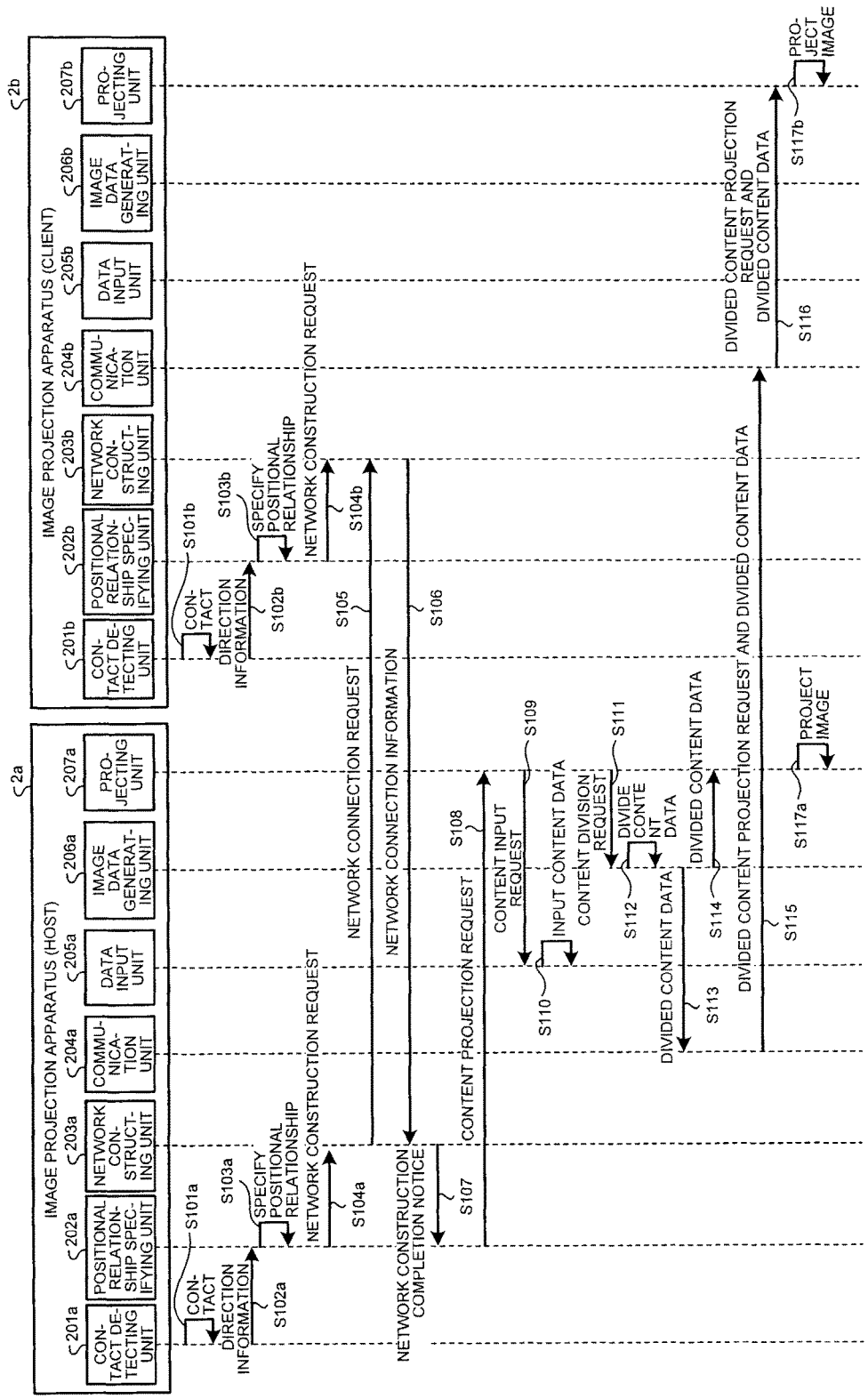
FIG. 9 is a sequence diagram illustrating an example of operation performed when two image projection apparatuses perform interconnected projection in the first embodiment.

FIG. 9 is a sequence diagram illustrating an example of operation performed when the two image projection apparatuses perform interconnected projection in the first embodiment. With reference to FIG. 9, operation performed by the two image projection apparatuses 2 (2a and 2b) to specify the positional relationships and project images based on pieces of divided content data in an interconnected manner will be described in detail. In the image projection apparatus 2a, a contact detecting unit 201a (detecting means), a positional relationship specifying unit 202a (specifying means), a network constructing unit 203a, a communication unit 204a (communication means), a data input unit 205a, an image data generating unit 206a (dividing means), and a projecting unit 207a (projecting means) correspond to the contact detecting unit 201, the positional relationship specifying unit 202, the network constructing unit 203, the communication unit 204, the data input unit 205, the image data generating unit 206, and the projecting unit 207 illustrated in FIG. 4, respectively. Further, in the image projection apparatus 2b, a contact detecting unit 201b (detecting means), a positional relationship specifying unit 202b (specifying means), a network constructing unit 203b, a communication unit 204b (communication means), a data input unit 205b, an image data generating unit 206b (dividing means), and a projecting unit 207b (projecting means) correspond to the contact detecting unit 201, the positional relationship specifying unit 202, the network constructing unit 203, the communication unit 204, the data input unit 205, the image data generating unit 206, and the projecting unit 207 illustrated in FIG. 4, respectively. Furthermore, the image projection apparatus 2a is located on the left side of the image projection apparatus 2b as they face a projected object.

Step S101a

The contact detecting unit 201a of the image projection apparatus 2a detects contact with the contact detecting unit 201b of the image projection apparatus 2b. The contact detecting unit 201a refers to the position determination information 110 stored in the image projection apparatus 2a and generates direction information indicating a position of the image projection apparatus 2a relative to the image projection apparatus 2b. The contact detecting unit 201a transmits the generated direction information to the contact detecting unit 201b via NFC and receives direction information on the image projection apparatus 2b from the contact detecting unit 201b via NFC.

Step S101b

The contact detecting unit 201b of the image projection apparatus 2b detects contact with the contact detecting unit 201a of the image projection apparatus 2a. The contact detecting unit 201b refers to the position determination information 110 stored in the image projection apparatus 2b and generates direction information indicating a position of the image projection apparatus 2b relative to the image projection apparatus 2a. The contact detecting unit 201b transmits the generated direction information to the contact detecting unit 201a via NFC and receives direction information on the image projection apparatus 2a from the contact detecting unit 201a via NFC.

Step S102a

The contact detecting unit 201a sends, to the positional relationship specifying unit 202a, the generated direction information and the direction information on the image projection apparatus 2b received from the contact detecting unit 201b.

Step S102b

The contact detecting unit 201b sends, to the positional relationship specifying unit 202b, the generated direction information and the direction information on the image projection apparatus 2a received from the contact detecting unit 201a.

Step S103a

The positional relationship specifying unit 202a of the image projection apparatus 2a specifies a positional relationship between the image projection apparatus 2a and the image projection apparatus 2b based on the direction information on the image projection apparatus 2a and the direction information on the image projection apparatus 2b received from the contact detecting unit 201a. Further, the positional relationship specifying unit 202a determines whether the image projection apparatus 2a is the "host" or the "client" based on the specified positional relationship. Specifically, the positional relationship specifying unit 202a determines that the image projection apparatus 2a is the "host" based on the specified positional relationship, that is, based on the fact that the image projection apparatus 2a is located on the left side of the image projection apparatus 2b as they face the projected object.

Step S103b

The positional relationship specifying unit 202b of the image projection apparatus 2b specifies a positional relationship between the image projection apparatus 2b and the image projection apparatus 2a based on the direction information on the image projection apparatus 2b and the direction information on the image projection apparatus 2a received from the contact detecting unit 201b. Further, the positional relationship specifying unit 202b determines whether the image projection apparatus 2b is the "host" or the "client" based on the specified positional relationship. Specifically, the positional relationship specifying unit 202b determines that the image projection apparatus 2b is the "client" based on the specified positional relationship, that is, based on the fact that the image projection apparatus 2b is located on the right side of the image projection apparatus 2a as they face the projected object.

Step S104a

The positional relationship specifying unit 202a sends a network construction request to the network constructing unit 203a in order to construct a network with the image projection apparatus 2b.

Step S104b

The positional relationship specifying unit 202b sends a network construction request to the network constructing unit 203b in order to construct a network with the image projection apparatus 2a.

Step S105

The network constructing unit 203a of the image projection apparatus 2a serving as the "host" transmits, to the network constructing unit 203b of the image projection apparatus 2b serving as the "client", a network connection request containing information necessary to construct the network.

Step S106

Upon receiving the network connection request from the network constructing unit 203a, the network constructing unit 203b of the image projection apparatus 2b serving as the "client" transmits, to the network constructing unit 203a, network connection information containing information necessary to construct the network.

Step S107

The network constructing unit 203a constructs the network upon receiving the network connection information from the network constructing unit 203b, and sends a network construction completion notice to the positional relationship specifying unit 202a.

Step S108

The positional relationship specifying unit 202a sends, to the projecting unit 207a, a content projection request to project an image based on the content data.

Step S109

Upon receiving the content projection request from the positional relationship specifying unit 202a, the projecting unit 207a sends, to the data input unit 205a, a content input request to request input of the content data from an external apparatus.

Step S110

Upon receiving the content input request from the projecting unit 207a, the data input unit 205a inputs the content data from the external apparatus.

Step S111

After the data input unit 205a inputs the content data, the projecting unit 207a sends, to the image data generating unit 206a, a content division request to divide the content data.

Step S112

Upon receiving the content division request from the projecting unit 207a, the image data generating unit 206a divides the content data on the basis of the positional relationship specified by the positional relationship specifying unit 202a.

Step S113

The image data generating unit 206a converts a piece of divided content data to be projected by the image projection apparatus 2b among the content data having been divided (among pieces of divided content data) to data in a projectable format, and sends the converted data to the communication unit 204a.

Step S114

The image data generating unit 206a converts a piece of divided content data to be projected by the projecting unit 207a among the content data having been divided (among pieces of divided content data) to data in a projectable format, and sends the converted data to the projecting unit 207a.

Step S115

The communication unit 204a wirelessly transmits (distributes) the piece of divided content data, which is to be projected by the image projection apparatus 2b and is received from the image data generating unit 206a, to the communication unit 204b of the image projection apparatus 2b via the constructed network, together with a divided content projection request to project an image based on the piece of divided content data.

Step S116

The communication unit 204b of the image projection apparatus 2b sends, to the projecting unit 207b, the divided content projection request and the piece of divided content data that are wirelessly received from the communication unit 204a.

Step S117a

The projecting unit 207a of the image projection apparatus 2a projects, on a projected object such as a screen, an image based on the piece of divided content data in the projectable format received from the image data generating unit 206a. At this time, the projection image based on the piece of divided content data projected by the projecting unit 207a partly overlaps the projection image projected by the projecting unit 207b of the image projection apparatus 2b in accordance with the positional relationship specified by the positional relationship specifying unit 202a, so that the images are projected in an interconnected manner.

Step S117b

The projecting unit 207b of the image projection apparatus 2b projects, on the projected object such as a screen, an image based on the piece of divided content data in the projectable format received from the communication unit 204b. At this time, the projection image based on the piece of divided content data projected by the projecting unit 207b partly overlaps the projection image projected by the projecting unit 207a of the image projection apparatus 2a in accordance with the positional relationship specified by the positional relationship specifying unit 202b, so that the images are projected in an interconnected manner.

Through the above described operation, the image projection system 1 determines the "host" and the "client" based on the specified positional relationship between the image projection apparatuses 2a and 2b, and constructs a network between the "host" (the image projection apparatus 2a in FIG. 9) and the "client" (the image projection apparatus 2b in FIG. 9). The image projection apparatus 2 serving as the "host" divides the input content data based on the specified positional relationship, and transmits a piece of divided content data to be projected by the "client" to the "client". Then, the "host" and the "client" project images based on the respective pieces of divided content data on the projected object such as a screen, and connect the images to form a single continuous interconnected image.

The same operation as illustrated in FIG. 9 is performed by an image projection system including the three or more image projection apparatuses 2. Specifically, the image projection system including the three or more image projection apparatuses 2 determines the image projection apparatus 2 located on the leftmost and topmost side with its face toward the projected object as a "host", and constructs a network between the "host" and each of the "clients". The image projection apparatus 2 serving as the "host" divides the content data on the basis of the specified positional relationship, and distributes a piece of divided content data to each of the "clients". Each of the image projection apparatuses 2 projects an image based on the piece of divided content data.

Operation of Specifying Positional Relationship

Figure 10A:
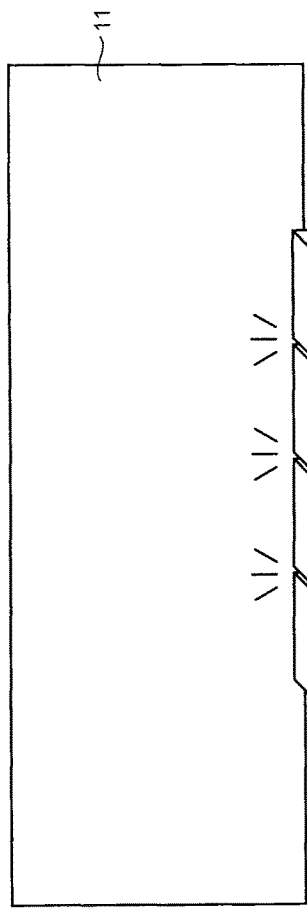
FIGS. 10A and 10B are diagrams for explaining operation performed by three or more image projection apparatuses to specify positional relationships.
Figure 10B:
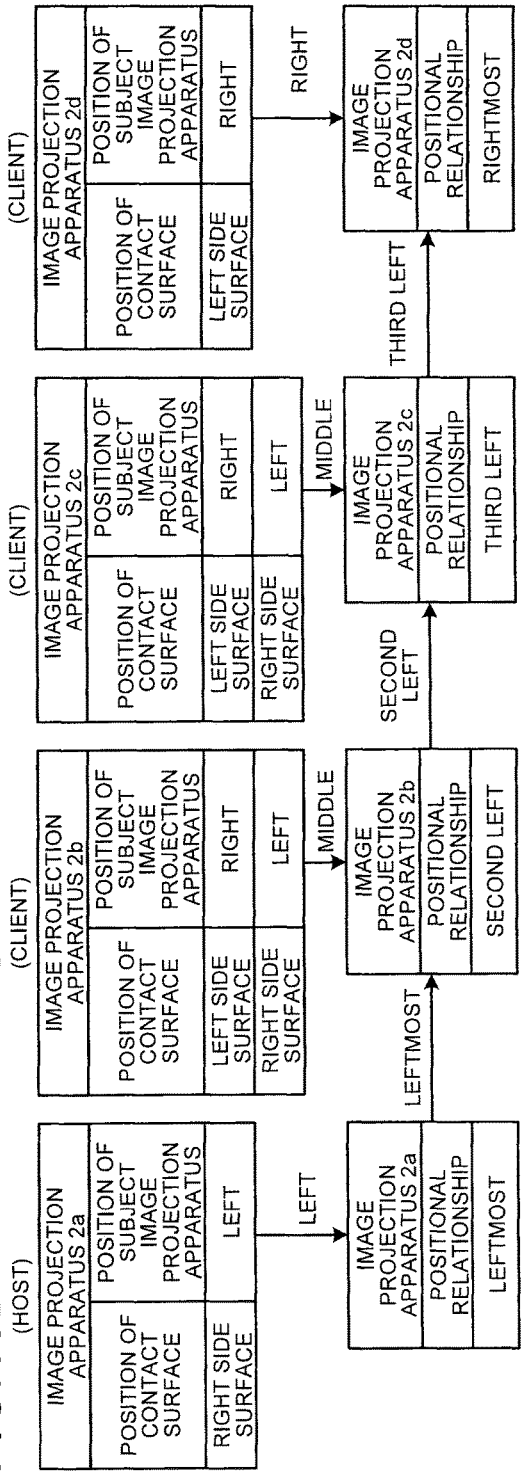

FIGS. 10A and 10B are diagrams for explaining operation performed by three or more image projection apparatuses to specify positional relationships. FIG. 11 is a flowchart illustrating an example of operation performed by the image projection apparatus to specify a positional relationship in the first embodiment. With reference to FIGS. 10A, 10B, and 11, the operation performed by the image projection apparatus 2 to specify positional relationships with the other image projection apparatuses 2 will be described.

With reference to FIGS. 10A and 10B, the flow of operation will be described, which is performed by each of the image projection apparatuses 2 to specify a positional relationship in an image projection system 1c including the four image projection apparatuses 2 (2a to 2d), for example. As illustrated in FIG. 10A, the image projection system 1c includes the image projection apparatuses 2a to 2d, which are arranged side by side in order of the image projection apparatuses 2a, 2b, 2c, and 2d from the left as they face the screen 11. FIG. 10A illustrates a state in which the image projection apparatuses 2a to 2d are in contact with the adjacent image projection apparatuses 2. Each of the image projection apparatuses 2a to 2d has a block configuration as illustrated in FIG. 4. In the description based on FIGS. 10A and 10B, "right" and "left" indicates a positional relationship when viewed in a direction normal to the sheet of FIG. 10A, that is, a positional relationship as the apparatuses face the screen 11 as illustrated in FIG. 10A.

First, the contact detecting unit 201 on the right side surface of the image projection apparatus 2a, when detecting contact with the contact detecting unit 201 on the left side surface of the image projection apparatus 2b, refers to the position determination information 110 (see FIG. 8) on the image projection apparatus 2a and generates direction information indicating a position relative to the image projection apparatus 2b. Specifically, the contact detecting unit 201 on the right side surface of the image projection apparatus 2a generates the direction information indicating that the position is on the "left" of the image projection apparatus 2b. The image projection apparatus 2a confirms that the contact detecting units 201 on the other surfaces are not in contact with the contact detecting units 201 of the other image projection apparatuses 2, and determines the positional relationship with the other image projection apparatuses 2 as "leftmost". The positional relationship specifying unit 202 of the image projection apparatus 2a determines that the image projection apparatus 2a is the "host" based on the specified positional relationship. The contact detecting unit 201 on the right side surface of the image projection apparatus 2a transmits information indicating the specified positional relationship to the contact detecting unit 201 on the left side surface of the image projection apparatus 2b via NFC.

Next, the contact detecting unit 201 on the left side surface of the image projection apparatus 2b, when detecting contact with the contact detecting unit 201 on the right side surface of the image projection apparatus 2a, refers to the position determination information 110 on the image projection apparatus 2b and generates direction information indicating a position relative to the image projection apparatus 2a. Specifically, the contact detecting unit 201 on the left side surface of the image projection apparatus 2b generates the direction information indicating that the position is on the "right" of the image projection apparatus 2a. The contact detecting unit 201 on the right side surface of the image projection apparatus 2b, when detecting contact with the contact detecting unit 201 on the left side surface of the image projection apparatus 2c, refers to the position determination information 110 on the image projection apparatus 2b and generates direction information indicating a position relative to the image projection apparatus 2c.

Specifically, the contact detecting unit 201 on the right side surface of the image projection apparatus 2b generates the direction information indicating that the position is on the "left" of the image projection apparatus 2c. The image projection apparatus 2b confirms that the contact detecting units 201 on the other surfaces, rather than the left side surface and the right side surface, are not in contact with the contact detecting units 201 of the other image projection apparatuses 2. Then, the image projection apparatus 2b specifies the positional relationship with the other image projection apparatuses 2 as "second left" based on the generated direction information and information indicating the positional relationship ("leftmost") of the image projection apparatus 2a received from the image projection apparatus 2a. The positional relationship specifying unit 202 of the image projection apparatus 2b determines that the image projection apparatus 2b is the "client" based on the specified positional relationship. The contact detecting unit 201 on the right side surface of the image projection apparatus 2b transmits information indicating the specified positional relationship to the contact detecting unit 201 on the left side surface of the image projection apparatus 2c via NFC.

Through the above described method of specifying the positional relationship, the image projection apparatus 2c specifies the positional relationship with the other image projection apparatuses 2 as "third left" and determines that the image projection apparatus 2c is the "client" based on the specified positional relationship. The image projection apparatus 2d specifies the positional relationship with the other image projection apparatuses 2 as "rightmost" and determines that the image projection apparatus 2d is the "client" based on the specified positional relationship.

The above described method of specifying the positional relationships of the image projection apparatuses 2 does not necessarily have to be performed by the image projection system including the four image projection apparatuses 2 as illustrated in FIG. 10A, and may be performed by a system including a plurality of the image projection apparatuses 2 rather than the four image projection apparatuses 2.

When the image projection system includes the two image projection apparatuses 2, the direction information generated by each of the image projection apparatuses 2 is information that directly specifies the positional relationship with the other one of the image projection apparatuses 2, and the direction information is transmitted and received as described above with reference to FIGS. 7 and 9.

Next, with reference to FIG. 11, a specific example of operation will be described, which is performed by the image projection apparatus 2 to specify a positional relationship by contact with the other image projection apparatuses 2, and then generate information for specifying the positional relationship. The operation illustrated in FIG. 11 is a detail of the operation of specifying the positional relationship at Step S12 in FIG. 7.

Step S121

The image projection apparatus 2 (the first image projection apparatus), when any of the contact detecting units 201 arranged thereon detects contact with the contact detecting unit 201 of another image projection apparatus 2 (second image projection apparatus), refers to the position determination information 110 (see FIG. 8) and determines a position relative to the other image projection apparatus 2. Then, the process proceeds to Step S122.

Step S122

The image projection apparatus 2 determines whether there is another image projection apparatus 2 in contact with the contact detecting unit 201 on the left side surface. When there is no image projection apparatus 2 in contact with the contact detecting unit 201 on the left side surface (NO at Step S122), the process proceeds to Step S123. When such the image projection apparatus 2 is present (YES at Step S122), the process proceeds to Step S124.

Step S123

The image projection apparatus 2 sets a value of a lateral position contained in information indicating the own positional relationship (longitudinal position and lateral position) to "1". Then, the process proceeds to Step S126.

Step S124

The image projection apparatus 2 receives, from the other image projection apparatus 2 in contact with the contact detecting unit 201 on the left side surface, information indicating the positional relationship (longitudinal position and lateral position) of the other image projection apparatus 2 via NFC. Then, the process proceeds to Step S125.

Step S125

The image projection apparatus 2 adds "1" to a value of the lateral position contained in the received information indicating the positional relationship (longitudinal position and lateral position) of the other image projection apparatus 2 located on the left side, and employs the resultant information as the information indicating the own positional relationship (longitudinal position and lateral position) of the image projection apparatus 2. For example, when the information indicating the positional relationship of the other image projection apparatus 2 is such that (longitudinal position, lateral position)=(1, 1), the image projection apparatus 2 determines the information indicating the own positional relationship such that (longitudinal position, lateral position)=(1, 2). Then, the process proceeds to Step S126.

Step S126

The image projection apparatus 2 determines whether there is another image projection apparatus 2 in contact with the contact detecting unit 201 on the upper side surface. When there is no image projection apparatus 2 in contact with the contact detecting unit 201 on the upper side surface (NO at Step S126), the process proceeds to Step S127. When such the image projection apparatus 2 is present (YES at Step S126), the process proceeds to Step S128.

Step S127

The image projection apparatus 2 sets a value of the longitudinal position contained in the information indicating the own positional relationship (longitudinal position and lateral position) to "1". Then, the process proceeds to Step S130.

Step S128

The image projection apparatus 2 receives, from the other image projection apparatus 2 in contact with the contact detecting unit 201 on the upper side surface, information indicating the positional relationship (longitudinal position and lateral position) of the other image projection apparatus 2 via NFC. Then, the process proceeds to Step S129.

Step S129

The image projection apparatus 2 adds "1" to a value of the longitudinal position contained in the received information indicating the positional relationship (longitudinal position and lateral position) of the other image projection apparatus 2 located on the upper side, and employs the resultant information as the information indicating the own positional relationship (longitudinal position and lateral position). For example, when the information indicating the positional relationship of the other image projection apparatus 2 is such that (longitudinal position, lateral position)=(1, 1), the image projection apparatus 2 determines the information indicating the own positional relationship such that (longitudinal position, lateral position)= (2, 1). Then, the process proceeds to Step S130.

Step S130

The image projection apparatus 2 specifies the own information (longitudinal position, lateral position) obtained through the above described operation as the information indicating the positional relationship with the other image projection apparatus 2. Then, the process proceeds to Step S131.

Step S131

The image projection apparatus 2, whether there is another image projection apparatus 2 in contact with the contact detecting unit 201 on the right side surface or the lower side surface, transmits the information indicating the own positional relationship to the contacted other image projection apparatus 2 via NFC. Through the above described operation, each of the image projection apparatuses 2 included in the image projection system specifies the positional relationship with the other image projection apparatus 2.

As described above, in the image projection system according to the first embodiment, the image projection apparatus 2 determines a surface in contact with the other image projection apparatus 2, and then specifies the own positional relationship based on the determined direction information and information indicating the positional relationship received from the other image projection apparatus 2. Therefore, it becomes possible to specify the positional relationship with the other image projection apparatus 2 without an apparatus or equipment other than the image projection apparatus 2 to obtain the direction information on the image projection apparatus 2. Further, with the above described method of specifying the positional relationship of the image projection apparatus 2, each of the image projection apparatuses 2 can specify the own positional relationship in the image projection system and can connect projection images even when the image projection system includes the three or more image projection apparatuses 2.

Furthermore, the image projection system can appropriately divide content data based on the positional relationship specified by each of the image projection apparatuses 2, and, each of the image projection apparatuses 2 projects an image based on a piece of divided content data to project the projection images in an interconnected manner, so that a single continuous interconnected image can be formed. By projecting the interconnected image as described above, it becomes possible to project impressive video.

Moreover, the positional relationship specifying unit 202 determines whether the image projection apparatus 2 is the "host" or the "client" based on the specified positional relationship. The image projection apparatus 2 serving as the "host" divides content data based on the specified positional relationship and transmits a piece of divided content data to the image projection apparatus 2 serving as the "client". Namely, the single image projection apparatus 2 serving as the "host" divides content data and distributes a piece of divided content data to the image projection apparatus 2 serving as the "client". Therefore, it becomes possible to reduce the amount of data in the constructed network and to reduce time to project an image in each of the image projection apparatuses 2.

Furthermore, it is not necessary to provide an apparatus or equipment other than the image projection apparatus 2 in order to obtain the direction information on the image projection apparatus 2. Therefore, it becomes possible to reduce cost to realize the image projection system that forms an interconnected image.

The above described interconnected image is formed by performing interconnected projection such that projection images projected by the respective image projection apparatuses 2 partly overlap each other; however, it is not always necessary to overlap parts of the images. For example, it may be possible to form the interconnected image by connecting the projection images such that edges of the images coincide with each other.

Further, as described above with reference to FIGS. 10A, 10B, and 11, the image projection apparatus 2 receives the information indicating the positional relationship from the other image projection apparatus 2 in contact with the left side surface or the upper side surface, and transmits the information indicating the specified positional relationship to the other image projection apparatus 2 in contact with the right side surface or the lower side surface; however, it is not limited thereto. For example, it may be possible to receive the information indicating the positional relationship from the other image projection apparatus 2 in contact with the right side surface or the lower side surface, and transmit the information indicating the specified positional relationship to the other image projection apparatus 2 in contact with the left side surface or the upper side surface.

First Modification of First Embodiment

Figure 12:
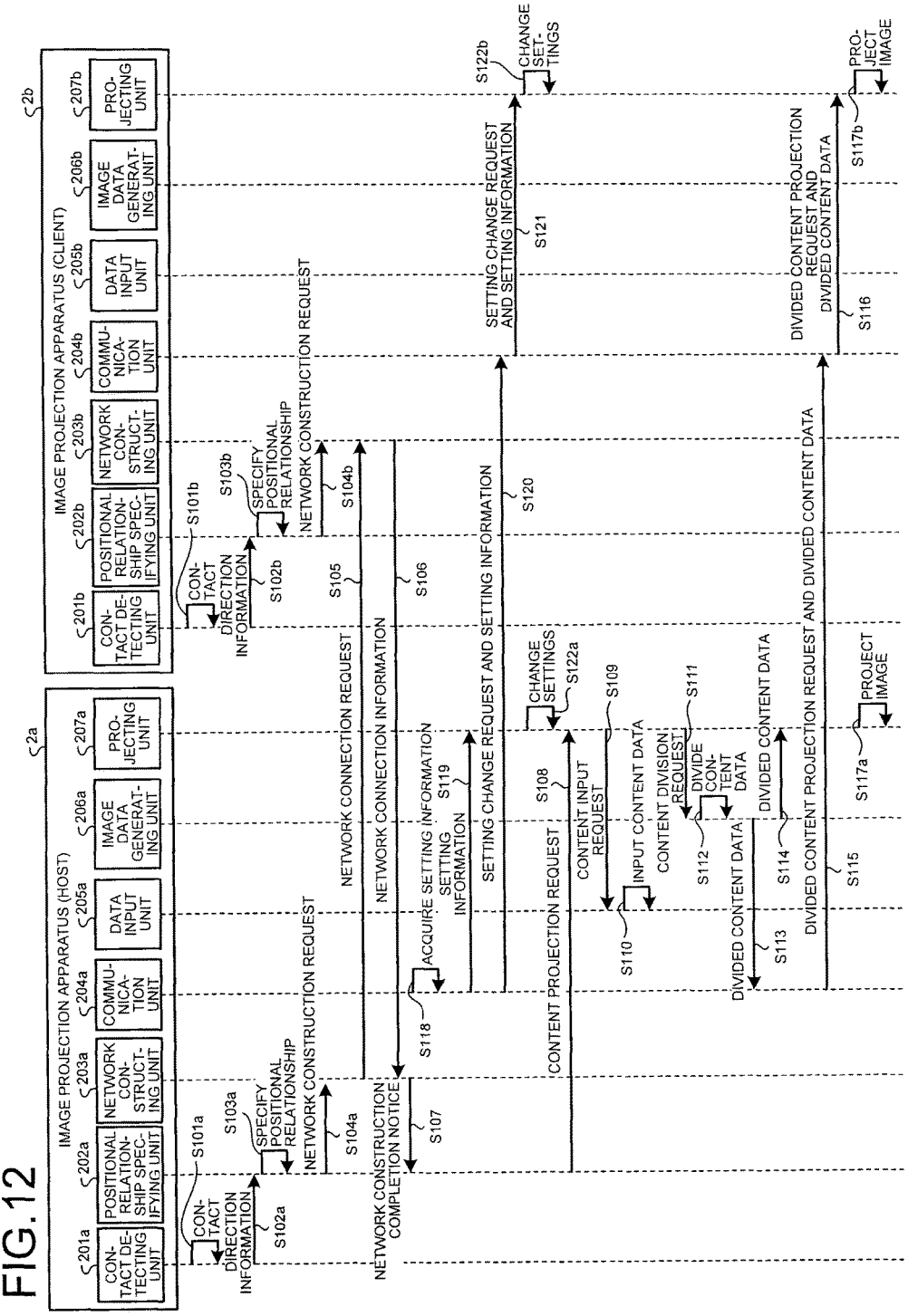
FIG. 12 is a sequence diagram illustrating an example of operation performed when two image projection apparatuses equalize pieces of setting information and then perform interconnected projection in a first modification of the first embodiment.

FIG. 12 is a sequence diagram illustrating an example of operation performed when two image projection apparatuses equalize pieces of setting information and then perform interconnected projection in a first modification of the first embodiment. With reference to FIG. 12, the operation of equalizing pieces of setting information and then performing interconnected projection according to the first modification of the first embodiment will be described.

Steps S101a to S107

Processes from Steps S101a to S107 illustrated in FIG. 12 are the same as the above described processes from Steps S101a to S107 illustrated in FIG. 9, respectively.

Step S118

After the network constructing units 203a and 203b construct the network, the communication unit 204a of the image projection apparatus 2a serving as the "host" acquires setting information from an external apparatus. The setting information is information for determining attributes, such as brightness and color tone, of images that are projected by the projecting units 207a and 207b based on the content data.

Step S119

The communication unit 204a sends the acquired setting information to the projecting unit 207a.

Step S120

The communication unit 204a transmits, to the communication unit 204b of the image projection apparatus 2b, a setting change request to request a change in the setting of the image to be projected, together with the acquired setting information.

Step S121

The communication unit 204b of the image projection apparatus 2b sends the received setting change request and the received setting information to the projecting unit 207b.

Step S122a

The projecting unit 207a of the image projection apparatus 2a changes the brightness, the color tone, and the like of the image to be projected, on the basis of the received setting information.

Step S122b

The projecting unit 207b of the image projection apparatus 2b changes the brightness, the color tone, and the like of the image to be projected, on the basis of the received setting information. The setting information used by the projecting unit 207b is equalized with the setting information used by the projecting unit 207a; therefore, the brightness, the color tone, and the like are the same between the images to be projected by the projecting units 207a and 207b.

Steps S108 to S116

Processes from Steps S108 to S116 illustrated in FIG. 12 are the same as the above described processes from Steps S108 to S116 illustrated in FIG. 9, respectively.

Step S117a

The projecting unit 207a of the image projection apparatus 2a projects, on the projected object such as a screen, an image based on the piece of divided content data in the projectable format received from the image data generating unit 206a on the basis of the changed brightness, the changed color tone, and the like. At this time, the projection image based on the piece of divided content data projected by the projecting unit 207a partly overlaps the projection image projected by the projecting unit 207b of the image projection apparatus 2b in accordance with the positional relationship specified by the positional relationship specifying unit 202a, so that the images are projected in an interconnected manner.

Step S117b

The projecting unit 207b of the image projection apparatus 2b projects, on the projected object such as a screen, an image based on the piece of divided content data in the projectable format received from the communication unit 204b on the basis of the changed brightness, the changed color tone, and the like. At this time, the projection image based on the piece of divided content data projected by the projecting unit 207b partly overlaps the projection image projected by the projecting unit 207a of the image projection apparatus 2a in accordance with the positional relationship specified by the positional relationship specifying unit 202b, so that the images are projected in an interconnected manner.

Through the above described operation, each of the image projection apparatuses 2 projects an image based on the divided content data on the basis of the equalized setting information, such as brightness and color tone. Therefore, the projection images to be projected in an interconnected manner can form an interconnected image with the equalized brightness and color tone.

Second Modification of First Embodiment

Figure 13:
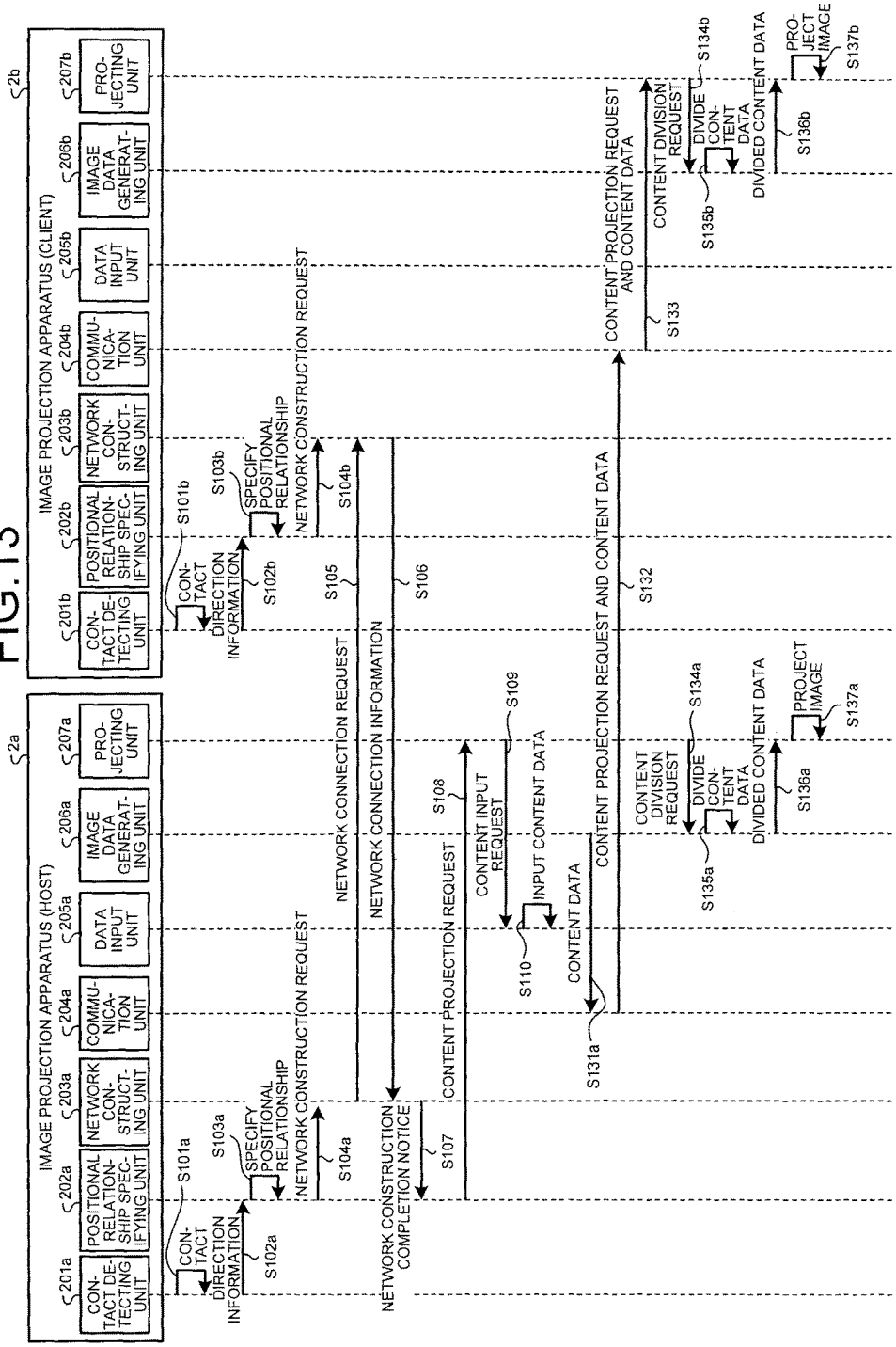
FIG. 13 is a sequence diagram illustrating an example of operation performed when each of two image projection apparatuses divides content data and then performs interconnected projection in a second modification of the first embodiment.

FIG. 13 is a sequence diagram illustrating an example of operation performed when each of two image projection apparatuses divides content data and then performs interconnected projection in a second modification of the first embodiment. With reference to FIG. 13, the operation will be described, which is performed by each of the image projection apparatuses 2 to divide content data and then perform interconnected projection in an image projection system according to the second modification of the first embodiment.

Steps S101a to S110

Processes from Steps S101a to S110 illustrated in FIG. 13 are the same as the above described processes from Steps S101a to S110 illustrated in FIG. 9, respectively.

Step S131a

The image data generating unit 206a of the image projection apparatus 2a sends the content data input by the data input unit 205a to the communication unit 204a.

Step S132a

The communication unit 204a wirelessly transmits (distributes) the content data received from the image data generating unit 206a to the communication unit 204b of the image projection apparatus 2b via the constructed network, together with a content projection request to project an image based on the content data.

Step S133

The communication unit 204b of the image projection apparatus 2b sends, to the projecting unit 207b, the content projection request and the content data wirelessly received from the communication unit 204a.

Step S134a

The projecting unit 207a sends, to the image data generating unit 206a, a content division request to divide the content data.

Step S134b

The projecting unit 207b sends, to the image data generating unit 206b, a content division request to divide the content data.

Step S135a

The image data generating unit 206a, upon receiving the content division request from the projecting unit 207a, divides the content data on the basis of the positional relationship specified by the positional relationship specifying unit 202a.

Step S135b

The image data generating unit 206b, upon receiving the content division request from the projecting unit 207b, divides the content data on the basis of the positional relationship specified by the positional relationship specifying unit 202b.

Step S136a

The image data generating unit 206a converts a piece of divided content data (divided content data) to data in a projectable format, and sends the converted data to the projecting unit 207a.

Step S136b

The image data generating unit 206b converts a piece of divided content data (divided content data) to data in a projectable format, and sends the converted data to the projecting unit 207b.

Step S137a

The projecting unit 207a of the image projection apparatus 2a projects, on the projected object such as a screen, an image based on the piece of divided content data in the projectable format received from the image data generating unit 206a. At this time, the projection image based on the piece of divided content data projected by the projecting unit 207a partly overlaps the projection image projected by the projecting unit 207b of the image projection apparatus 2b in accordance with the positional relationship specified by the positional relationship specifying unit 202a, so that the images are projected in an interconnected manner.

Step S137b

The projecting unit 207b of the image projection apparatus 2b projects, on the projected object such as a screen, an image based on the piece of divided content data in the projectable format received from the image data generating unit 206b. At this time, the projection image based on the piece of divided content data projected by the projecting unit 207b partly overlaps the projection image projected by the projecting unit 207a of the image projection apparatus 2a in accordance with the positional relationship specified by the positional relationship specifying unit 202b, so that the images are projected in an interconnected manner.

Through the above described operation, each of the image projection apparatuses 2 in the image projection system divides the content data based on the specified positional relationship, and extracts, as a piece of divided content data, a part to be projected as an image. Therefore, because the image projection apparatus 2 serving as the "client" also performs a process of dividing the content data, it becomes possible to cope with a case where a plurality of frames, such as a moving image, need to be extracted in a short time.

Second Embodiment

An image projection system according to a second embodiment will be described below. Configurations and operation different from the image projection system according to the first embodiment will be mainly described.

Configuration of Image Projection Apparatus

Figure 14:
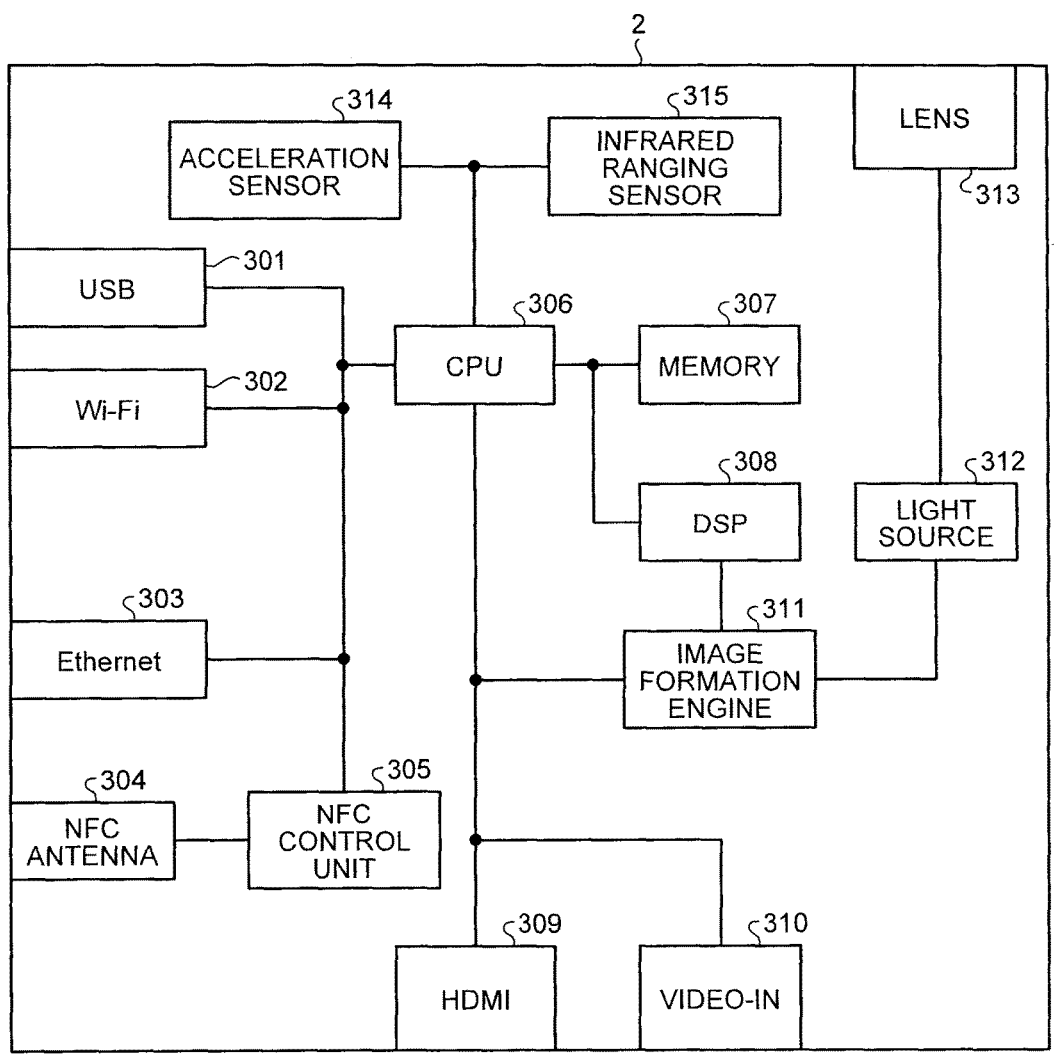
FIG. 14 is a diagram illustrating an example of a hardware configuration of an image projection apparatus according to a second embodiment.

FIG. 14 is a diagram illustrating an example of a hardware configuration of an image projection apparatus according to the second embodiment. With reference to FIG. 14, the hardware configuration of the image projection apparatus 2 in the image projection system will be described.

As illustrated in FIG. 14, the image projection apparatus 2 includes the components as illustrated in FIG. 3, an acceleration sensor 314 (distance detecting means), and an infrared ranging sensor 315.

The acceleration sensor 314 is a sensor that detects an inter-device distance dp that is a distance from the other image projection apparatus 2. The acceleration sensor 314 transmits information on the detected inter-device distance dp to the CPU 306.

The infrared ranging sensor 315 is a sensor that detects a projection distance ds that is a distance from the image projection apparatus 2 to a projected object, on the basis of a time taken for emitted infrared to return after reflection from the projected object such as a screen. The infrared ranging sensor 315 transmits information on the detected projection distance ds to the CPU 306.

Inter-device Distance that enables interconnected projection

Figure 15:
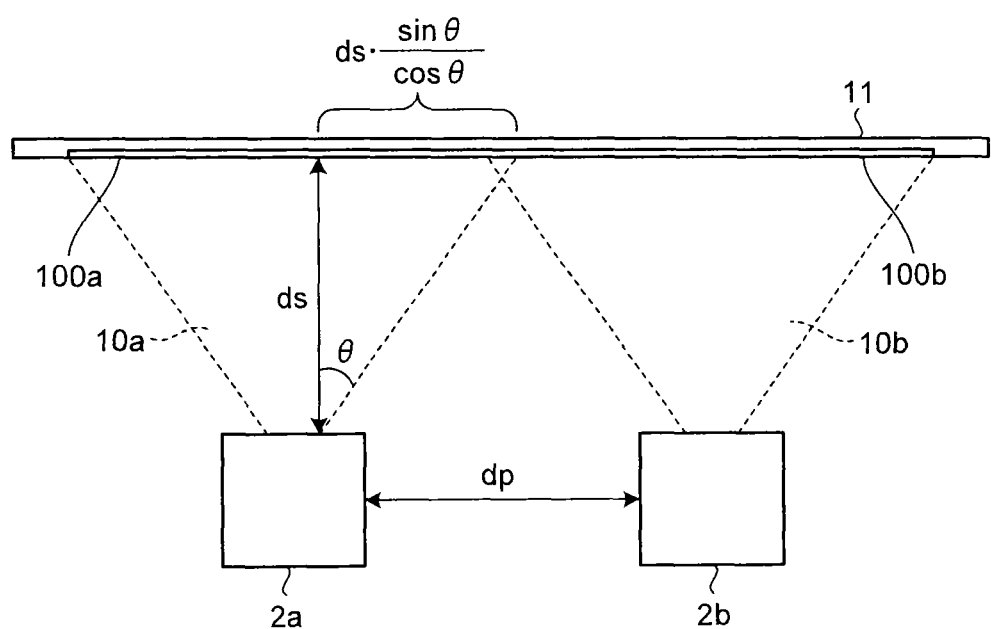
FIG. 15 is a diagram illustrating an inter-device distance in which two image projection apparatuses can perform interconnected projection.

FIG. 15 is a diagram illustrating an inter-device distance in which two image projection apparatuses can perform interconnected projection. With reference to FIG. 15, an inter-device distance dp in which interconnected projection is possible will be described. FIG. 15 illustrates a case in which the two image projection apparatuses 2a and 2b are first contacted with each other in the lateral direction and then moved in the lateral direction from the contact positions so as to be separated from each other.

As illustrated in FIG. 15, the image projection apparatus 2a emits the projection light 10a and projects the projection image 100a on the screen 11, and the image projection apparatus 2b emits the projection light 10b and projects the projection image 100b on the screen 11. The image projection apparatuses 2a and 2b have the same specifications, and a projection angle of each of the projection light 10a and the projection light 10b is denoted by θ as illustrated in FIG. 15.

A lateral width of the projection image 100a is calculated by Equation (1) below based on the projection distance ds, which is a distance to the screen 11 and which is detected by the infrared ranging sensor 315, and based on the above described projection angle θ.

$$\text{(Lateral width of the projection image 100a)}=2 \times ds \times (\sin \theta / \cos \theta) \quad (1)$$

Assuming that the projection distance ds detected by the infrared ranging sensor 315 of the image projection apparatus 2a and the projection distance ds detected by the infrared ranging sensor 315 of the image projection apparatus 2b are the same with each other, a lateral width of the projection image 100b is also calculated by Equation (1) as described above. In FIG. 15, when the inter-device distance dp, which is a distance between the image projection apparatus 2a and the image projection apparatus 2b and which is detected by the acceleration sensor 314, becomes greater than the sum of the value of one-half of the lateral width of the projection image 100a and the value of one-half of the lateral width of the projection image 100b, the image projection apparatuses 2a and 2b determine that it is not possible to project projection images in an interconnected manner. The sum of the value of one-half of the lateral width of the projection image 100a and the value of one-half of the lateral width of the projection image 100b is the same as a value calculated by the ride side of Equation (1).

When the inter-device distance dp is equal to or smaller than the above described sum, the image projection apparatuses 2a and 2b determine that it is possible to project the projection images in an interconnected manner. In this case, the image projection apparatus 2 serving as the "host" appropriately divides the input content data based on the inter-device distance dp so that a single continuous interconnected image can be formed when each of the image projection apparatuses 2 projects an image based on a piece of divided content data.

In the above description, a condition has been explained in which the projection images are not interconnectable when the image projection apparatuses 2 are moved in the lateral direction, and the same applies when the two image projection apparatuses 2a and 2b are first contacted with each other in the longitudinal direction and then moved in the longitudinal direction from the contact positions so as to be separated from each other.

Further, when the image projection apparatuses 2a and 2b have different projection angles, and if Expression (2) below is satisfied, it is preferable to determine that the image projection apparatuses 2a and 2b are not able to project projection images in an interconnected manner. Here, the projection angle of the image projection apparatus 2a is denoted by θ1, and the projection angle of the image projection apparatus 2b is denoted by θ2.

$$dp > ds \times (\sin \theta 1 / \cos \theta 1) + ds \times (\sin \theta 2 / \cos \theta 2) \quad (2)$$

Figure 16:
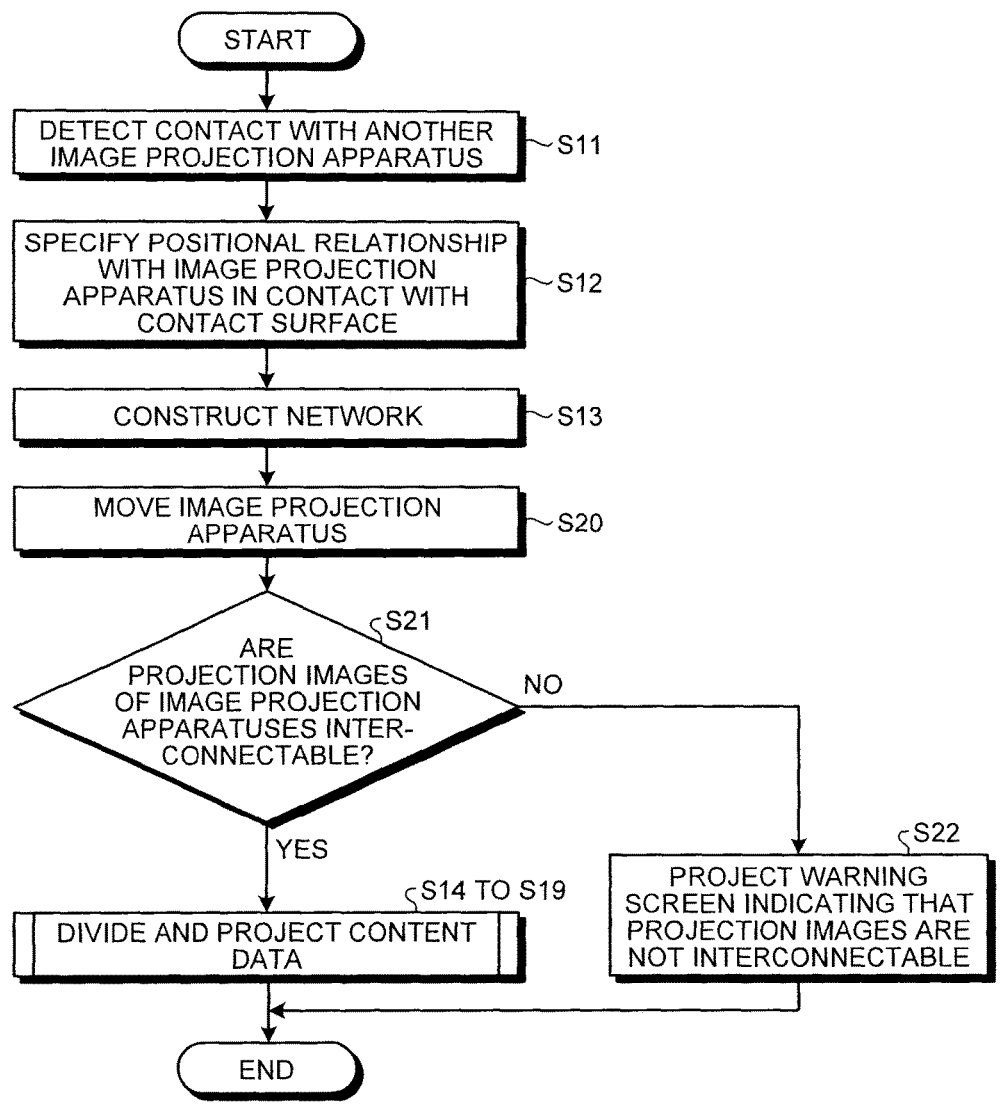
FIG. 16 is a flowchart illustrating an example of operation performed when the image projection apparatus performs interconnected projection or projects a warning screen in the second embodiment.
Figure 17:
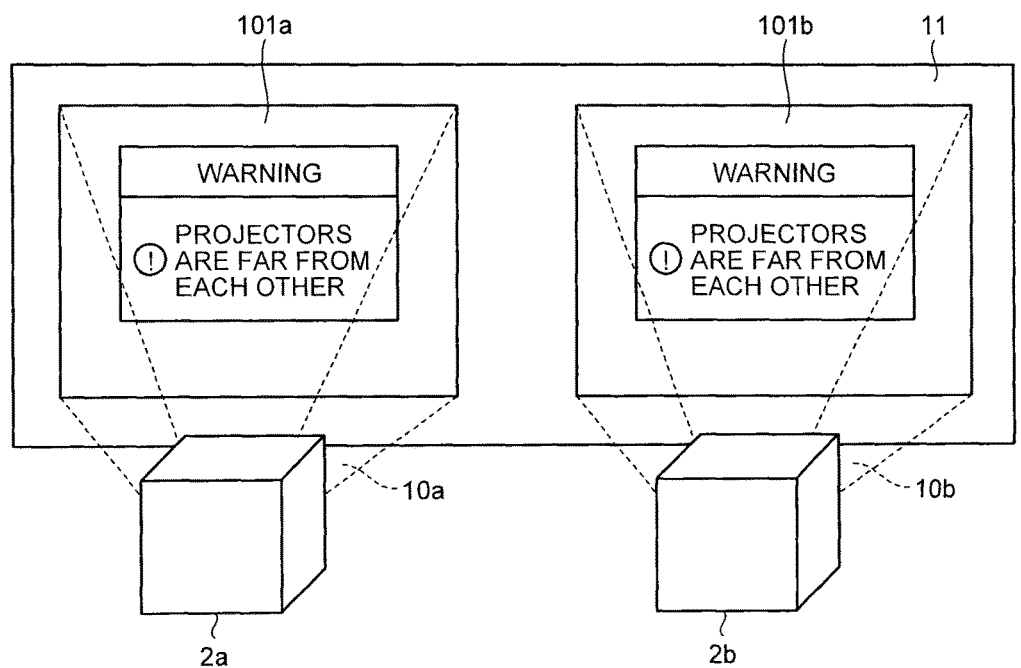
FIG. 17 is a diagram for explaining warning operation using the warning screen.

Warning operation performed when inter-device distance exceeds a distance in which interconnected projection is possible FIG. 16 is a flowchart illustrating an example of operation performed when the image projection apparatus performs interconnected projection or projects a warning screen in the second embodiment. FIG. 17 is a diagram for explaining warning operation using the warning screen. With reference to FIGS. 16 and 17, the warning operation performed when the inter-device distance exceeds a distance in which interconnected projection is possible will be described.

Steps S11 and S12

Processes at Steps S11 and S12 illustrated in FIG. 16 are the same as the above described processes at Steps S11 and S12 illustrated in FIG. 7, respectively.

Step S13

The network constructing unit 203 of the image projection apparatus 2 constructs a network by exchanging information necessary to construct the network with the other image projection apparatus 2 via the Wi-Fi interface 302 on a wireless communication. Then, the process proceeds to Step S20.

Step S20

A user moves the image projection apparatus 2 by a predetermined distance from the other image projection apparatus 2 to separate the apparatuses from each other. Then, the process proceeds to Step S21.

Step S21

The image projection apparatus 2 determines whether interconnected projection between own projection image and a projection image projected by the other image projection apparatus 2 is possible. Specifically, as described above, the image projection apparatus 2 determines whether the inter-device distance dp, which is a distance from the other image projection apparatus 2 and which is detected by the acceleration sensor 314, is greater than the sum of the value of one-half of the lateral width of the own projection image and the value of one-half of the lateral width of the projection image of the other image projection apparatus 2. When the inter-device distance dp is equal to or smaller than the sum, the image projection apparatus 2 determines that the interconnected projection is possible (YES at Step S21), and the process proceeds to Step S14. When the inter-device distance dp is greater than the sum, the image projection apparatus 2 determines that the interconnected projection is not possible (NO at Step S21), and the process proceeds to Step S22.

Steps S14 to S19

Processes from Steps S14 to S19 illustrated in FIG. 16 are the same as the above described processes from Steps S14 to S19 illustrated in FIG. 7, respectively. However, at Step S16, the image data generating unit 206 divides the content data on the basis of the positional relationship specified by the positional relationship specifying unit 202 and the inter-device distance dp detected by the acceleration sensor 314.

Step S22

The image projection apparatus 2 projects, on the projected object such as a screen, an image for giving warning that the interconnected projection with the other image projection apparatus 2 is not possible. Specifically, for example, as illustrated in FIG. 17, when the inter-device distance dp between the image projection apparatus 2a and the image projection apparatus 2b is a distance in which the interconnected projection is not possible, the image projection apparatus 2a projects, on the screen 11, a projection image 101a as a screen for giving warning that the interconnected projection using the projection light 10a is not possible. Further, the image projection apparatus 2b projects, on the screen 11, a projection image 101b as a screen for giving warning that the interconnected projection using the projection light 10b is not possible.

As in the operation as described above, the warning screen is projected when the inter-device distance dp is a distance in which the two image projection apparatuses 2 are not able to perform interconnected projection; therefore, a user can confirm the situation and check the degree of a distance by which the two image projection apparatuses 2 can be separated. In this case, it is preferable that the user moves the image projection apparatus 2 to reduce the inter-device distance dp so that the interconnected projection becomes possible.

Further, in the image projection apparatus 2, the image data generating unit 206 divides the content data based on the positional relationship specified by the positional relationship specifying unit 202 and the inter-device distance dp detected by the acceleration sensor 314. Therefore, the image projection apparatus 2 can change a content of a piece of divided content data of an image to be projected by each of the image projection apparatuses 2 in conjunction with a change in the inter-device distance dp.

Modification of Second Embodiment

Figure 18:
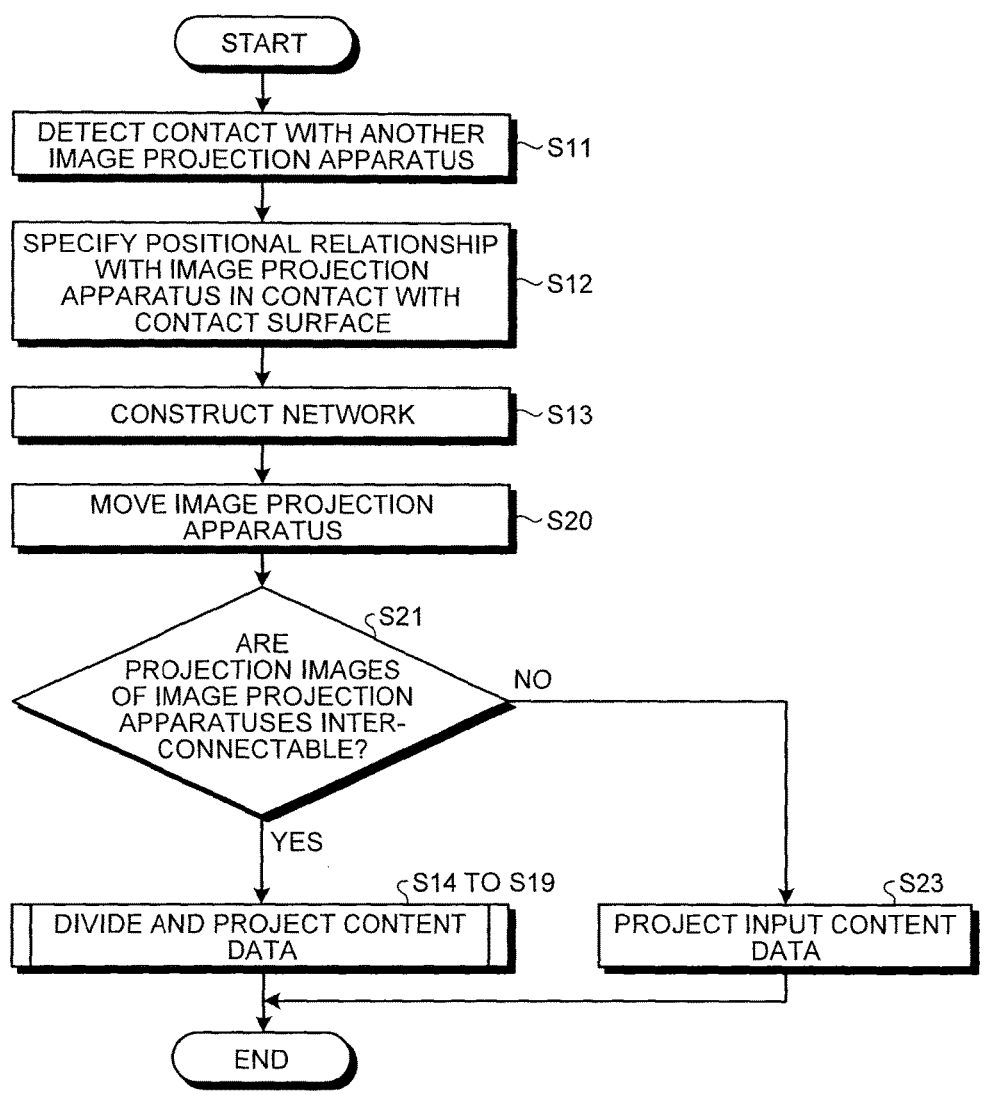
FIG. 18 is a flowchart illustrating an example of operation performed when the image projection apparatus performs interconnected projection or projects content data as it is in a modification of the second embodiment.

FIG. 18 is a flowchart illustrating an example of operation performed when the image projection apparatus performs interconnected projection or projects content data as it is in a modification of the second embodiment. With reference to FIG. 18, operation will be described, which is performed by each of the image projection apparatuses 2 to project content data as it is without dividing the content data when the inter-device distance exceeds a distance in which the interconnected projection is possible.

Steps S11 to S13, S20, S21, and S14 to S19

Processes at Steps S11 to S13, S20, S21, and S14 to S19 illustrated in FIG. 18 are the same as the above described processes at Steps S11 to S13, S20, S21, and S14 to S19 illustrated in FIG. 16, respectively. However, at Step S21, when the image projection apparatus 2 determines that the interconnected projection is not possible (NO at Step S21), the process proceeds to Step S23.

Step S23

At Step S12, the image projection apparatus 2 determined as the "host" causes the own data input unit 205 to input content data from an external apparatus, and wirelessly transmits (distributes) the content data to the image projection apparatus 2 determined as the "client" without dividing the content data. The image projection apparatus 2 serving as the "host" and the image projection apparatus 2 serving as the "client" project images based on the content data as it is on the projected object such as a screen.

As in the operation as described above, when the inter-device distance dp is a distance in which the two image projection apparatuses 2 are not able to perform the interconnected projection, and if the content data is projected without being divided, it becomes possible to construct multi screens that project video with the same content. Further, although the warning screen as illustrated in FIG. 17 is not displayed, projection of the multi screens enables the user to recognize that the inter-device distance dp is a distance in which the interconnected projection is not possible.

After it is determined whether the projection image is interconnectable at Step S21, or in the process at Step S15 or Step S23, the image projection apparatus 2 serving as the "host" inputs the content data; however, it is not limited thereto. Namely, the image projection apparatus 2 serving as the "host" may input the content data and wirelessly transmit the content data to the image projection apparatus 2 serving as the "client" in advance after the network is constructed at Step S13 and before the interconnectability is determined at Step S21. In this case, it is preferable that each of the image projection apparatuses 2 projects the content data after dividing the content data or projects the content data as it is, in accordance with the interconnectability.

Third Embodiment

An image projection system according to a third embodiment will be described. Differences from the image projection system according to the first embodiment will be mainly described.

Figure 19:
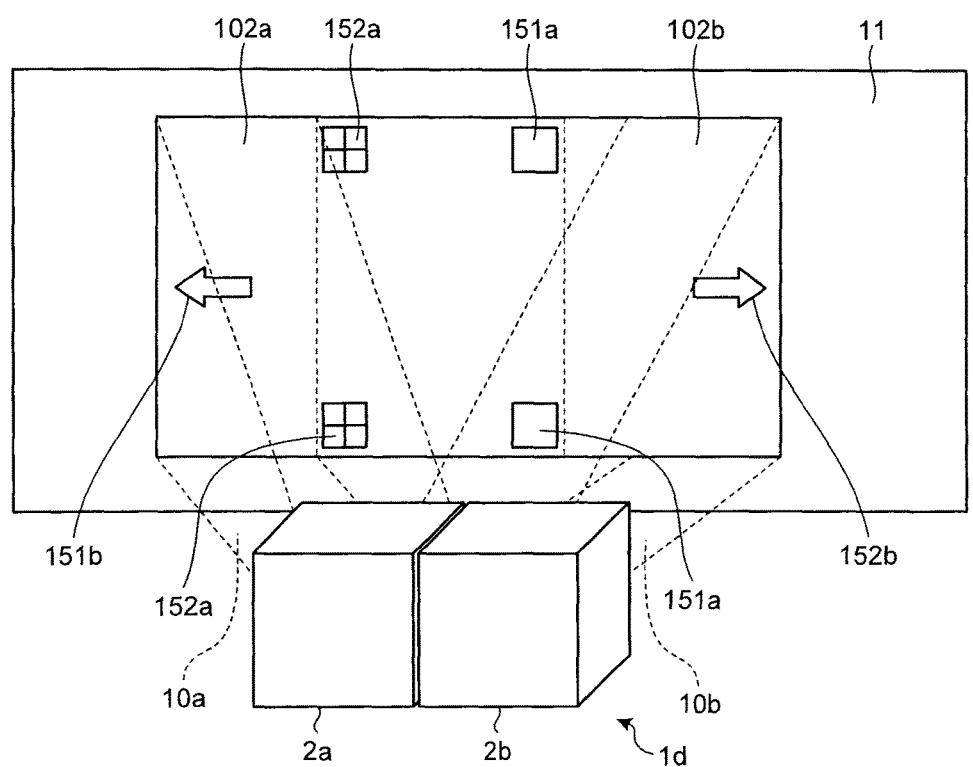
FIG. 19 is a diagram for explaining position adjustment of projection images of image projection apparatuses in a third embodiment.

FIG. 19 is a diagram for explaining position adjustment of projection images of the image projection apparatuses in the third embodiment. With reference to FIG. 19, operation of adjusting positions of the projection images according to marks contained in the projection images of the image projection apparatuses 2 will be described.

As illustrated in FIG. 19, an image projection system 1d includes the image projection apparatuses 2a and 2b that are projectors. The image projection apparatus 2a emits the projection light 10a and projects a projection image 102a on the screen 11. The image projection apparatus 2b emits the projection light 10b and projects a projection image 102b on the screen 11. The number of the image projection apparatuses 2 included in the image projection system 1d is not limited to two as illustrated in FIG. 19, and may be three or more.

The projection image 102a includes position adjustment marks 151a (mark images) to adjust the position so as to be interconnected with the projection image 102b, and includes a moving direction mark 151b indicating a guiding direction in which the image projection apparatus 2a is moved. The projection image 102b includes position adjustment marks 152a (mark images) to adjust the position so as to be interconnected with the projection image 102a, and includes a moving direction mark 152b indicating a guiding direction in which the image projection apparatus 2b is moved.

The image projection system 1d specifies a positional relationship of each of the image projection apparatuses 2 as illustrated in FIG. 7. The image projection apparatus 2 serving as the "host" divides the input content data, and wirelessly transmits (distributes) a piece of divided content data to the image projection apparatus 2 serving as the "client". Each of the image projection apparatuses 2 (the image projection apparatuses 2a and 2b in FIG. 19) projects an image based on the piece of divided content data on the screen 11. The content data may be divided by the image projection apparatus 2 serving as the "client", instead of the image projection apparatus 2 serving as the "host".

Each of the projection images projected on the screen 11 includes marks for displaying the projection images in an interconnected manner. As illustrated in FIG. 19, the operation of adjusting the position of the projection image 102a of the image projection apparatus 2a and the position of the projection image 102b of the image projection apparatus 2b will be described.

It is assumed that the image projection apparatuses 2a and 2b do not appropriately project the projection images based on the pieces of divided content data in an interconnected manner when they are in contact with each other. When the position adjustment marks 151a included in the projection image 102a and the position adjustment marks 152a included in the projection image 102b overlap each other, the projection image 102a and the projection image 102b form a single continuous interconnected image. Therefore, the user first moves the image projection apparatus 2a or the image projection apparatus 2b in the direction indicated by the moving direction mark 151b contained in the projection image 102a or in the direction indicated by the moving direction mark 152b contained in the projection image 102b. Specifically, the user moves the image projection apparatus 2a to the left, when viewed in a direction normal to the sheet of FIG. 19, according to the moving direction mark 151b that is contained in the projection image 102a and that indicates a leftward direction. Alternatively, the user moves the image projection apparatus 2b to the right, when viewed in a direction normal to the sheet of FIG. 19, according to the moving direction mark 152b that is contained in the projection image 102b and that indicates a rightward direction. Namely, the user moves the image projection apparatus 2a or the image projection apparatus 2b in the direction in which the image projection apparatus 2a and the image projection apparatus 2b are separated from each other. The user moves the image projection apparatus 2a or the image projection apparatus 2b until the position adjustment marks 151a included in the projection image 102a and the position adjustment marks 152a included in the projection image 102b overlap each other. The user finishes the operation of moving the image projection apparatus 2a or the image projection apparatus 2b when the position adjustment marks 151a and the position adjustment marks 152a overlap each other, and determines the positions at this time as the positions of the image projection apparatus 2a and the image projection apparatus 2b.

With the configurations and operation as described above, it is possible to adjust the positions of the projection images at low cost, without a device such as the acceleration sensor 314 and the infrared ranging sensor 315 as provided in the image projection apparatus 2 of the second embodiment.

Fourth Embodiment

An image projection system according to a fourth embodiment will be described. Differences from the image projection system according to the first embodiment will be mainly described. The configuration of the image projection system of the fourth embodiment is the same as the image projection system of the first embodiment.

FIG. 20 is a sequence diagram illustrating an example of operation performed when two image projection apparatuses equalize pieces of time information and then perform interconnected projection in the fourth embodiment. With reference to FIG. 20, the operation of equalizing pieces of time information and then performing interconnected projection in the image projection system according to the fourth embodiment will be described.

Steps S101a to S107

Processes from Steps S101a to S107 illustrated in FIG. 20 are the same as the above described processes from Steps S101a to S107 illustrated in FIG. 9, respectively.

Step S141

After the network constructing units 203a and 203b construct the network, the communication unit 204a of the image projection apparatus 2a serving as the "host" acquires time information indicating a current time from an external apparatus.

Step S142

The communication unit 204a sends the acquired time information to the projecting unit 207a.

Step S143

The communication unit 204a transmits, to the communication unit 204b of the image projection apparatus 2b, a time change request to request a change in the setting of time, together with the acquired time information.

Step S144

The communication unit 204b of the image projection apparatus 2b sends the received time change request and the received time information to the projecting unit 207b.

Steps S108 to S116

Processes from Steps S108 to S116 illustrated in FIG. 20 are the same as the above described processes from Steps S108 to S116 illustrated in FIG. 9, respectively.

Step S145a

The projecting unit 207a updates own time information with the time information received from the communication unit 204a, and adjusts a timing to project an image based on a piece of divided content data on the projected object such as a screen, on the basis of the updated time information.

Step S145b

The projecting unit 207b updates own time information with the time information received from the communication unit 204b, and adjusts a timing to project an image based on a piece of divided content data on the projected object such as a screen, on the basis of the updated time information.

Step S146a

The projecting unit 207a projects, on the projected object such as a screen, the image based on the piece of divided content data in the projectable format received from the image data generating unit 206a on the basis of the adjusted timing. At this time, the projection image based on the piece of divided content data projected by the projecting unit 207a partly overlaps the projection image projected by the projecting unit 207b of the image projection apparatus 2b in accordance with the positional relationship specified by the positional relationship specifying unit 202a, so that the images are projected in an interconnected manner.

Step S146b

The projecting unit 207b projects, on the projected object such as a screen, the image based on the piece of divided content data in the projectable format received from the communication unit 204b on the basis of the adjusted timing. At this time, the projection image based on the piece of divided content data projected by the projecting unit 207b partly overlaps the projection image projected by the projecting unit 207a of the image projection apparatus 2a in accordance with the positional relationship specified by the positional relationship specifying unit 202a, so that the images are projected in an interconnected manner.

Through the above described operation, each of the image projection apparatuses 2 can project images based on a piece of divided content data at the adjusted timing. Therefore, it becomes possible to prevent a sense of discomfort due to the shift of the timing of in a connected portion of the interconnected image.

A computer program executed by the CPU or the like of the image projection apparatus 2 of the above described embodiments is provided by being stored in a computer-readable storage medium, such as a CD-ROM, CD-R, a memory card, a digital versatile disk (DVD), or a flexible disk (FD), in a computer-installable or computer-executable file format.

The computer program executed by the CPU or the like of the image projection apparatus 2 of the above described embodiments may be stored in a computer connected to a network, such as the Internet, and provided by being downloaded via the network. The computer program executed by the CPU or the like of the image projection apparatus 2 of the above described embodiments may be provided or distributed via a network, such as the Internet. The computer program executed by the CPU or the like of the image projection apparatus 2 of the above described embodiments may be provided by being incorporated in a ROM or the like in advance.

The computer program executed by the CPU or the like of the image projection apparatus 2 of the above described embodiments has a module configuration for implementing the functions executed by the above described CPU or the like on the computer. As actual hardware, the CPU or the like reads the computer program from the storage medium and executes the computer program, so that the above described functions are implemented on the computer.

According to an embodiment, it is possible to specify positional relationships of a plurality of image projection apparatuses even without an apparatus or equipment, other than the image projection apparatuses, for recognizing the positions of the image projection apparatuses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection system comprising:
   a plurality of image projection apparatuses including a first image projection apparatus and a second image projection apparatus;
   a plurality of sensors, each of which is arranged on one of at least two outer surfaces of a housing of the first image projection apparatus and detects whether the second image projection apparatus is in contact with or adjacent to the one of the outer surfaces of the first image projection apparatus;
   processing circuitry configured to
      specify a positional relationship between the first image projection apparatus and the second image projection apparatus in accordance with which one of the outer surfaces of the first image projection apparatus a respective one of the sensors, which has detected contact or adjacency with the second image projection apparatus, is provided on, wherein the processing circuitry determines that the second image projection apparatus is adjacent to or in contact with the first image projection apparatus at a particular side of the housing and is facing a same surface at a same direction depending on which sensor, among the plurality of sensors, detects the second image projection apparatus;
      divide content data into pieces of divided content data corresponding to the respective image projection apparatuses on the basis of the positional relationship; and
      control projection of a first projection image based on a piece of the divided content data corresponding to the first image projection apparatus on a projected object, and interconnect the first projection image to a second projection image projected by the second image projection apparatus.

2. The image projection system according to claim 1, further comprising:
   a plurality of the second image projection apparatuses, wherein
   each of the sensors, when detecting that any one of the second image projection apparatuses is in contact with or adjacent to the outer surface on which a respective one of the sensors is provided, generates direction information indicating a position of the first image projection apparatus relative to the one of the second image projection apparatuses, and receives information indicating the positional relationship from the second image projection apparatus that is in contact with or adjacent to a predetermined outer surface of the first image projection apparatus,
   the processing circuitry specifies the positional relationship of the first image projection apparatus based on the direction information generated by each of the sensors and based on the information indicating the positional relationship received by each of the sensors, and
   each of the sensors transmits information indicating the positional relationship specified by the processing circuitry to the second image projection apparatus in contact with or adjacent to the outer surface other than the predetermined outer surface.

3. The image projection system according to claim 1, wherein
the processing circuitry determines whether each of the image projection apparatuses serves as a host or a client based on the positional relationship,
the image projection apparatus serving as the host includes the processing circuitry, and
the image projection system further comprises:
a communication interface that transmits a piece of the divided content data divided by the processing circuitry to the image projection apparatus serving as the client.

4. The image projection system according to claim 1, wherein
the processing circuitry determines whether each of the image projection apparatuses serves as a host or a client based on the positional relationship,
each of the image projection apparatus serving as the host and the image projection apparatus serving as the client includes the processing circuitry, and
the image projection system further comprises:
a communication interface that transmits the content data from the image projection apparatus serving as the host to the image projection apparatus serving as the client.

5. The image projection system according to claim 3, wherein
the communication interface causes the image projection apparatus serving as the host to acquire setting information for determining an attribute of an image from outside, and causes the image projection apparatus serving as the host to transmit the setting information to the image projection apparatus serving as the client, and
the processing circuitry changes an attribute of an image to be projected, on the basis of the setting information.

6. The image projection system according to claim 3, wherein
the communication interface causes the image projection apparatus serving as the host to acquire time information from outside, and transmits the time information from the image projection apparatus serving as the host to the image projection apparatus serving as the client, and
the processing circuitry adjusts a timing to project the first projection image, on the basis of the time information.

7. The image projection system according to claim 1, wherein each of the plurality of sensors is configured to detect an inter-device distance, which is a distance between the image projection apparatuses that each of the sensors has detected as being in contact with or adjacent to each other, wherein
the processing circuitry divides the content data based on the inter-device distance and the positional relationship.

8. The image projection system according to claim 7, wherein the processing circuitry controls projection of an image for displaying a warning when the detected inter-device distance is a distance in which the first projection image is not interconnectable to the second projection image.

9. The image projection system according to claim 4, wherein each of the plurality of sensors is configured to detect an inter-device distance, which is a distance between the image projection apparatuses that each of the sensors has detected as being in contact with or adjacent to each other, wherein
when the detected inter-device distance is a distance in which the first projection image is interconnectable to the second projection image, the processing circuitry controls projection of the first projection image based on a piece of the divided content data that the processing circuitry has divided based on the inter-device distance and the positional relationship, and
when the detected inter-device distance is a distance in which the first projection image is not interconnectable to the second projection image, the processing circuitry controls projection of an image based on the content data.

10. The image projection system according to claim 1, wherein each of the first projection image and the second projection image includes a mark image for position adjustment to interconnect the first projection image and the second projection image.

11. An image projection apparatus comprising:
a housing;
a plurality of sensors, each of which is arranged on one of at least two of outer surfaces of the housing and detects whether any one of other image projection apparatuses is in contact with or adjacent to the one of the outer surfaces of the image projection apparatus;
processing circuitry configured to
specify positional relationships of the image projection apparatus and the other image projection apparatuses in accordance with which one of the outer surfaces of the image projection apparatus a respective one of the sensors, which has detected contact or adjacency with the other image projection apparatuses, is provided on and determines whether the image projection apparatus serves as a host or a client on the basis of the positional relationships, wherein the processing circuitry determines that another image projection apparatus is adjacent to or in contact with the image projection apparatus at a particular side of the housing and is facing a same surface at a same direction depending on which sensor, among the plurality of sensors, detects the other image projection apparatus, and
divide, when it is determined that the image projection apparatus serves as the host, content data into pieces of divided content data corresponding to the respective image projection apparatuses on the basis of the positional relationship; and
a communication interface that, when the processing circuitry determines that the image projection apparatus serves as the host, transmits a piece of the divided content data to a corresponding one of the other image projection apparatuses,
wherein the processing circuitry projects a first projection image based on a piece of the divided content data on a projected object, and interconnects the first projection image to second projection images projected by the other image projection apparatuses.

12. A method implemented by an image projection system that includes a plurality of image projection apparatuses, including a first image projection apparatus and a second image projection apparatus, and a plurality of sensors, each of which is arranged on one of at least two outer surfaces of a housing of the first image projection apparatus and detects whether the second image projection apparatus is in contact with or adjacent to the one of the outer surfaces of the first image projection apparatus, the method comprising:

specifying, by processing circuitry, a positional relationship between the first image projection apparatus and the second image projection apparatus in accordance with which one of the outer surfaces of the first image projection apparatus a respective one of the sensors, which has detected contact or adjacency with the second image projection apparatus, is provided on, wherein the processing circuitry determines that the second image projection apparatus is adjacent to or in contact with the first image projection apparatus at a particular side of the housing and is facing a same surface at a same direction depending on which sensor, among the plurality of sensors, detects the second image projecting apparatus;

dividing, by the processing circuitry, content data into pieces of divided content data corresponding to the respective image projection apparatuses on the basis of the positional relationship; and controlling, by the processing circuitry, projection of a first projection image based on a piece of the divided content data corresponding to the first image projection apparatus on a projected object, and interconnects the first projection image to a second projection image projected by the second image projection apparatus.

* * * * *